United States Patent
Komaike

(10) Patent No.: US 11,945,115 B2
(45) Date of Patent: Apr. 2, 2024

(54) MACHINE LEARNING DEVICE AND ROBOT SYSTEM PROVIDED WITH SAME

(71) Applicant: YAMAHA HATSUDOKI KABUSHIKI KAISHA, Iwata (JP)

(72) Inventor: Kunimune Komaike, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 286 days.

(21) Appl. No.: 17/053,466

(22) PCT Filed: Jun. 14, 2018

(86) PCT No.: PCT/JP2018/022807
§ 371 (c)(1),
(2) Date: Nov. 6, 2020

(87) PCT Pub. No.: WO2019/239562
PCT Pub. Date: Dec. 19, 2019

(65) Prior Publication Data
US 2021/0229275 A1    Jul. 29, 2021

(51) Int. Cl.
*B25J 9/00*    (2006.01)
*B25J 9/16*    (2006.01)

(52) U.S. Cl.
CPC .......... *B25J 9/163* (2013.01); *B25J 9/1612* (2013.01); *B25J 9/1697* (2013.01)

(58) Field of Classification Search
CPC ........ B25J 9/163; B25J 9/1612; B25J 9/1697; G05B 2219/40053
See application file for complete search history.

(56) References Cited

U.S. PATENT DOCUMENTS 9,764,475 B2 *   9/2017   Suzuki .................. B25J 9/1697
10,717,196 B2 *   7/2020   Yamazaki ............... B25J 9/163
(Continued)

FOREIGN PATENT DOCUMENTS

CA    2625163 A1 *   4/2007   ........... B25J 19/022
CN    106612094 A    5/2017
(Continued)

OTHER PUBLICATIONS

J. Wang, P. Rogers, L. Parker, D. Brooks and M. Stilman, "Robot Jenga: Autonomous and strategic block extraction," 2009 IEEE/RSJ International Conference on Intelligent Robots and Systems, 2009, pp. 5248-5253, doi: 10.1109/IROS.2009.5354303. (Year: 2009).*
(Continued)

*Primary Examiner* — Khoi H Tran
*Assistant Examiner* — Tien Minh Le
(74) *Attorney, Agent, or Firm* — Studebaker & Brackett PC

(57) ABSTRACT

An action of a robot included in a robot system is controlled based on a learning result of a machine learning device. The machine learning device includes a behavior observing unit, a displaced amount observing unit, and a learning unit. The behavior observing unit observes a behavior pattern of the robot picking out a workpiece from a container. The displaced amount observing unit observes, based on pieces of image data captured before and after the pick-out action of the robot and output from an image capturing device, a workpiece displaced amount indicating a displaced amount of an untargeted workpiece in the container caused by picking out a targeted workpiece from the container. The learning unit learns an influence rate on the untargeted workpiece with an associated behavior pattern of the robot for picking out the targeted workpiece from the container,
(Continued)

the influence rate depending on the workpiece displaced amount.

10 Claims, 13 Drawing Sheets

(56) References Cited

U.S. PATENT DOCUMENTS

| | | | | |
|---|---|---|---|---|
| 10,930,037 | B2* | 2/2021 | Namiki | G06V 10/82 |
| 11,014,231 | B2* | 5/2021 | Parikh | B25J 9/1687 |
| 11,117,261 | B2* | 9/2021 | Mori | B25J 9/1666 |
| 11,173,599 | B2* | 11/2021 | Levine | B25J 9/161 |
| 2007/0274812 | A1* | 11/2007 | Ban | B25J 9/1697 |
| | | | | 414/217 |
| 2010/0004778 | A1* | 1/2010 | Arimatsu | G06T 1/0014 |
| | | | | 700/214 |
| 2014/0114888 | A1* | 4/2014 | Noda | G06K 9/6256 |
| | | | | 706/12 |
| 2017/0028553 | A1 | 2/2017 | Tsuda et al. | |
| 2017/0028562 | A1* | 2/2017 | Yamazaki | B25J 9/163 |
| 2017/0117841 | A1 | 4/2017 | Watanabe et al. | |
| 2017/0252922 | A1* | 9/2017 | Levine | B25J 9/1664 |
| 2017/0252924 | A1* | 9/2017 | Vijayanarasimhan | |
| | | | | G05B 19/18 |
| 2017/0285584 | A1 | 10/2017 | Nakagawa et al. | |
| 2017/0297206 | A1* | 10/2017 | Correll | B25J 15/08 |
| 2018/0071874 | A1* | 3/2018 | Bergeron | B25J 13/04 |
| 2018/0089589 | A1* | 3/2018 | Ooba | G05B 19/4182 |
| 2018/0257225 | A1* | 9/2018 | Satou | B25J 9/1697 |
| 2018/0290307 | A1* | 10/2018 | Watanabe | G06T 7/97 |
| 2018/0354124 | A1* | 12/2018 | Oumi | B25J 9/1664 |
| 2019/0134821 | A1* | 5/2019 | Patrick | B25J 9/06 |
| 2019/0224844 | A1 | 7/2019 | Tsuda et al. | |
| 2019/0261566 | A1* | 8/2019 | Robertson | B25J 9/1697 |
| 2020/0254622 | A1 | 8/2020 | Yamazaki et al. | |
| 2021/0001482 | A1 | 1/2021 | Tsuda et al. | |

FOREIGN PATENT DOCUMENTS

| | | | | |
|---|---|---|---|---|
| DE | 10 2016 009 113 A1 | | 2/2017 | |
| DE | 10 2017 002 996 A1 | | 10/2017 | |
| DE | 10 2017 008 836 A1 | | 3/2018 | |
| EP | 1 862 270 B1 | | 4/2012 | |
| JP | 2013-052490 A | | 3/2013 | |
| JP | 2017-030135 A | | 2/2017 | |
| JP | 2017030135 A | * | 2/2017 | B25J 9/1602 |
| JP | 2017-064910 A | | 4/2017 | |
| JP | 2017064910 A | * | 4/2017 | B25J 9/1602 |
| JP | 2018-008343 A | | 1/2018 | |
| JP | 2018008343 A | * | 1/2018 | |
| JP | 2018-039059 A | | 3/2018 | |
| JP | 2018039059 A | * | 3/2018 | |
| WO | WO-2006063314 A2 | * | 6/2006 | A01D 46/30 |

OTHER PUBLICATIONS

An Office Action issued by the German Patent Office dated Feb. 22, 2022, which corresponds to German Patent Application No. 11 2018 007 729.2 and is related to U.S. Appl. No. 17/053,466 with English language translation.

International Search Report issued in PCT/JP2018/022807; dated Sep. 11, 2018.

An Office Action mailed by China National Intellectual Property Administration dated Feb. 15, 2023, which corresponds to Chinese Application No. 201880093236.0 and is related to U.S. Appl. No. 17/053,466; with English language summary.

* cited by examiner

| SUPERVISED DATA TD | |
|---|---|
| BEHAVIOR PATTERN | WORKPIECE DISPLACED AMOUNT |
| BEHAVIOR A1 | WD1 |
| BEHAVIOR A2 | WD2 |
| BEHAVIOR A3 | WD3 |

LEARN PROCESSING

| BEHAVIOR PATTERN | INFLUENCE RATE IM | DETERMINING WORKPIECE DISPLACED AMOUNT | REWARD R |
|---|---|---|---|
| BEHAVIOR A1 | IM1 | WD1 < THRESHOLD WDT | R1 > 0 |
| BEHAVIOR A2 | IM2 | WD2 ≧ THRESHOLD WDT | R2 = 0 |
| BEHAVIOR A3 | IM3 | WD3 ≧ THRESHOLD WDT | R2 = 0 |

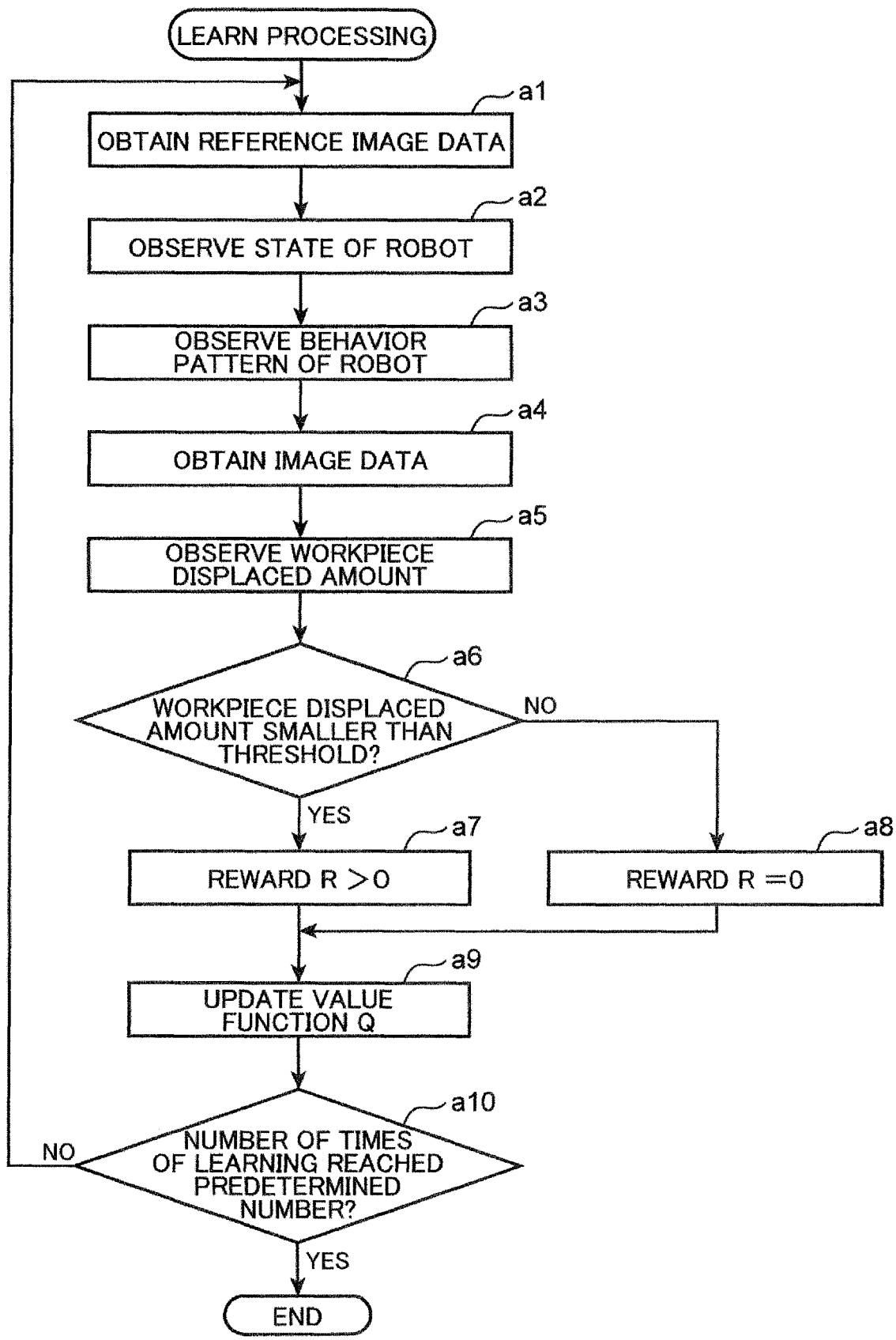

FIG. 9A

BEHAVIOR PATTERN
DETERMINING INFORMATION JH1

| WORKPIECE TYPE (J11) | BEHAVIOR PATTERN (J12) | INFLUENCE RATE IM (J13) |
|---|---|---|
| W1 | BEHAVIOR A1 | 20 |
| W2 | BEHAVIOR A2 | 10 |
| W3 | BEHAVIOR A3 | 1 |
| W4 | BEHAVIOR A4 | 0.5 |
| W5 | BEHAVIOR A5 | 0.1 |
| ... | ... | ... |

FIG. 9B

BEHAVIOR PATTERN
DETERMINING INFORMATION JH1A

| WORKPIECE TYPE (J11) | BEHAVIOR PATTERN (J12) | INFLUENCE RATE IM (J13) |
|---|---|---|
| W1 | BEHAVIOR A11 | 0.2 |
| W2 | BEHAVIOR A21 | 0.01 |
| W6 | BEHAVIOR A61 | 0.3 |
| W7 | BEHAVIOR A71 | 20 |
| W8 | BEHAVIOR A81 | 40 |
| ... | ... | ... |

FIG. 10A

| ORDER | WORKPIECE TYPE | BEHAVIOR PATTERN | INFLUENCE RATE IM |
|---|---|---|---|
| 1 | W5 | BEHAVIOR A5 | 0.1 |
| 2 | W4 | BEHAVIOR A4 | 0.5 |
| 3 | W3 | BEHAVIOR A3 | 1 |
| 4 | W2 | BEHAVIOR A2 | 10 |
| 5 | W1 | BEHAVIOR A1 | 20 |
| ... | ... | ... | ... |

J21: REFERENCE VALUE OF INFLUENCE RATE: IMS

BEHAVIOR INSTRUCTING INFORMATION JH2

BEHAVIOR LIST INFORMATION J22

REFERENCE VALUE OF INFLUENCE RATE: IMS — J21

BEHAVIOR INSTRUCTING INFORMATION JH2A

BEHAVIOR LIST INFORMATION J22

| ORDER | WORKPIECE TYPE (J11) | BEHAVIOR PATTERN (J12) | INFLUENCE RATE IM (J13) |
|---|---|---|---|
| 1 | W2 | BEHAVIOR A21 | 0.01 |
| 2 | W1 | BEHAVIOR A11 | 0.2 |
| 3 | W6 | BEHAVIOR A61 | 0.3 |
| 4 | W7 | BEHAVIOR A71 | 20 |
| 5 | W8 | BEHAVIOR A81 | 40 |
| ... | ... | ... | ... |

MACHINE LEARNING DEVICE AND ROBOT SYSTEM PROVIDED WITH SAME

CROSS-REFERENCE TO RELATED APPLICATION

This application is a National Stage of International Patent Application No. PCT/JP2018/022807, filed Jun. 14, 2018, the entire content of which is incorporated herein by reference.

BACKGROUND

Technical Field

The present disclosure relates to a machine learning device that learns an action of a robot picking out randomly stacked workpieces, and a robot system including the machine learning device.

Background Art

As a system for picking out a workpiece from a container containing a plurality of randomly stacked workpieces, a robot system for picking out a workpiece by a robot including a hand unit is known, as described in JP 2017-64910 A. The robot system disclosed in JP 2017-64910 A includes a machine learning device that learns a pick-out action of a robot. The machine learning device learns an action of the robot picking out a workpiece from a container based on a robot action corresponding to a three dimensional map of workpieces measured by a three dimensional measuring device and supervised data associated with a result of determining success/unsuccess of picking out a workpiece.

However, the learning using the supervised data including the result of determining success/unsuccess of picking out a workpiece is far from learning an optimum pick-out action of the robot. Even if a targeted workpiece is successfully picked out from the container by the hand unit of the robot, this pick-out action might have influence on untargeted workpieces in the container. For example, in the action of picking out the targeted workpiece from the container, the hand unit or the targeted workpiece grabbed by the hand unit might apply an impact force to the untargeted workpieces. In other cases, picking out of the targeted workpiece might cause the stack of the untargeted workpieces to collapse. As described above, if the pick-out action to pick out the targeted workpiece has influence on the untargeted workpieces in the container, the workpieces might be damaged.

SUMMARY

The present disclosure is made in view of the circumstances described above. Accordingly, the present disclosure provides a machine learning device that can learn an optimum action of a robot to pick out a workpiece from a container containing a plurality of randomly stacked workpieces, and a robot system including the machine learning device.

A machine learning device according to one aspect of the present disclosure is a device that learns an action of a robot including a hand unit to pick out, from a container containing a plurality of randomly stacked workpieces, the workpiece. A machine learning device includes a behavior observing unit configured to observe a behavior pattern of the robot performing a pick-out action to pick out a targeted workpiece by the hand unit from the container, a displaced amount observing unit configured to observe, based on pieces of image data captured before and after the pick-out action by the robot and output from an image capturing device that captures an image of an inside of the container, a workpiece displaced amount indicating a displaced amount of an untargeted workpiece, not the targeted workpiece, in the container, caused by the hand unit picking out the targeted workpiece from the container, and a learning unit configured to learn, based on supervised data in which the behavior pattern and the workpiece displaced amount are associated with each other, an influence rate on the untargeted workpiece with the associated behavior pattern for picking out the targeted workpiece by the hand unit from the container, the influence rate depending on the workpiece displaced amount.

A robot system according to another aspect of the present disclosure includes a robot including a hand unit that picks out, from a container containing a plurality of randomly stacked workpieces, the workpiece, an image capturing device that captures an image of an inside of the container and outputs image data, the machine learning device configured to learn, based on the image data, a pick-out action of the robot to pick out the workpiece from the container by the hand unit, and a controlling device configured to control an action of the robot based on a learning result of the machine learning device.

Objects, features, and advantages of the present disclosure will be clarified from the following detailed description and accompanying drawings.

BRIEF DESCRIPTION OF THE DRAWINGS

FIG. 8 is a flowchart illustrating learn processing performed by the machine learning device;

FIG. 9A is a figure for explaining behavior pattern determining information generated by a behavior determining unit of the machine learning device;

FIG. 9B is a figure for explaining the behavior pattern determining information generated by the behavior determining unit of the machine learning device;

FIG. 10A is a figure for explaining behavior instructing information generated by an order setting unit of the machine learning device;

FIG. 10B is a figure for explaining the behavior instructing information generated by the order setting unit of the machine learning device.

DETAILED DESCRIPTION

A machine learning device and a robot system according to an embodiment of the present disclosure will be described based on the drawings.

[General Configuration of Robot System]

Figure 1:
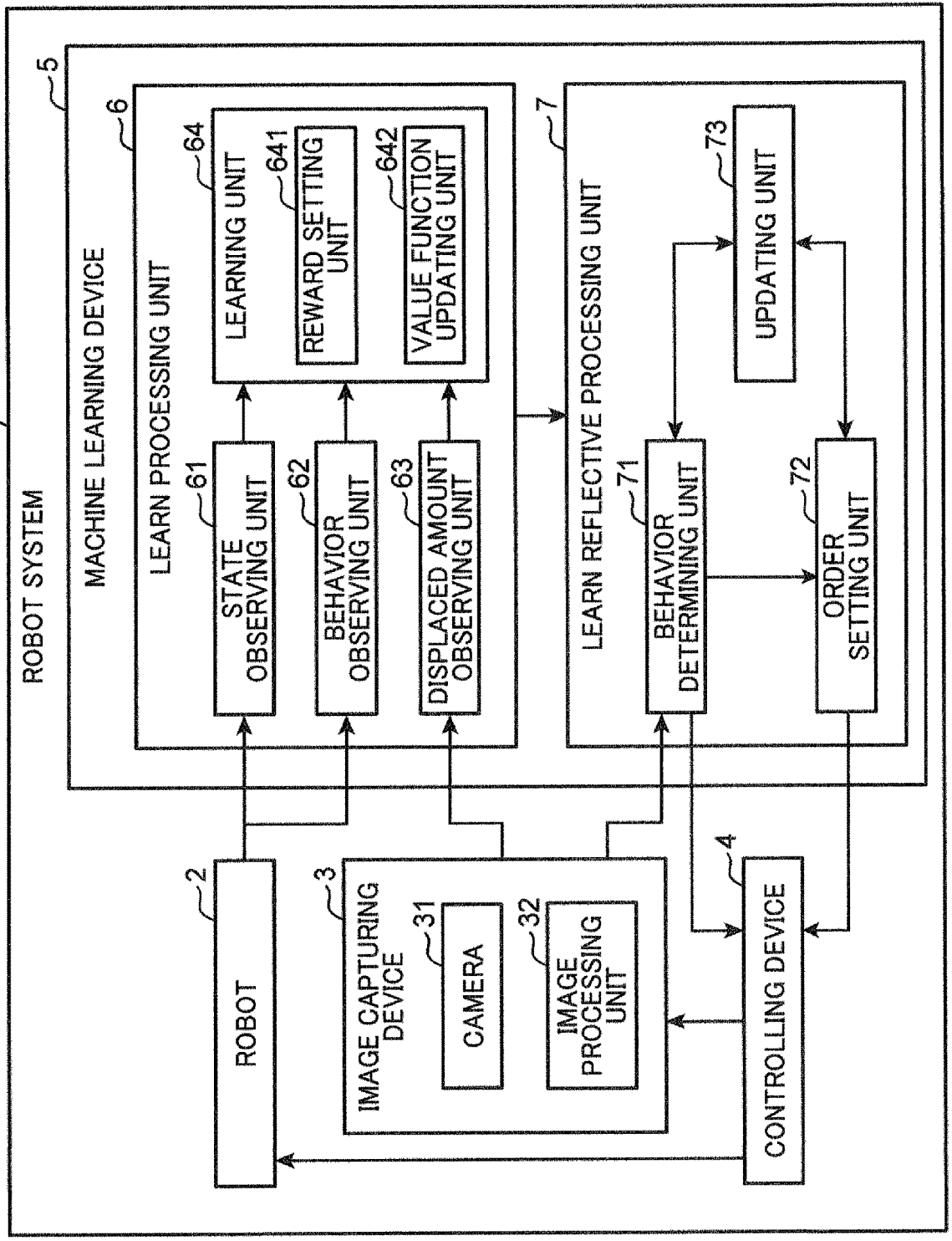
FIG. 1 is a block diagram illustrating a configuration of a robot system according to one embodiment of the present disclosure.

FIG. 1 is a block diagram illustrating a configuration of a robot system 1 according to one embodiment of the present disclosure. The robot system 1 includes a robot 2, an image capturing device 3, a controlling device 4, and a machine learning device 5. In the robot system 1, the machine learning device 5 learns an action of the robot 2 based on image data which is output from the image capturing device 3, and the controlling device 4 controls the action of the robot 2 based on a result of the learning.

Figure 2:
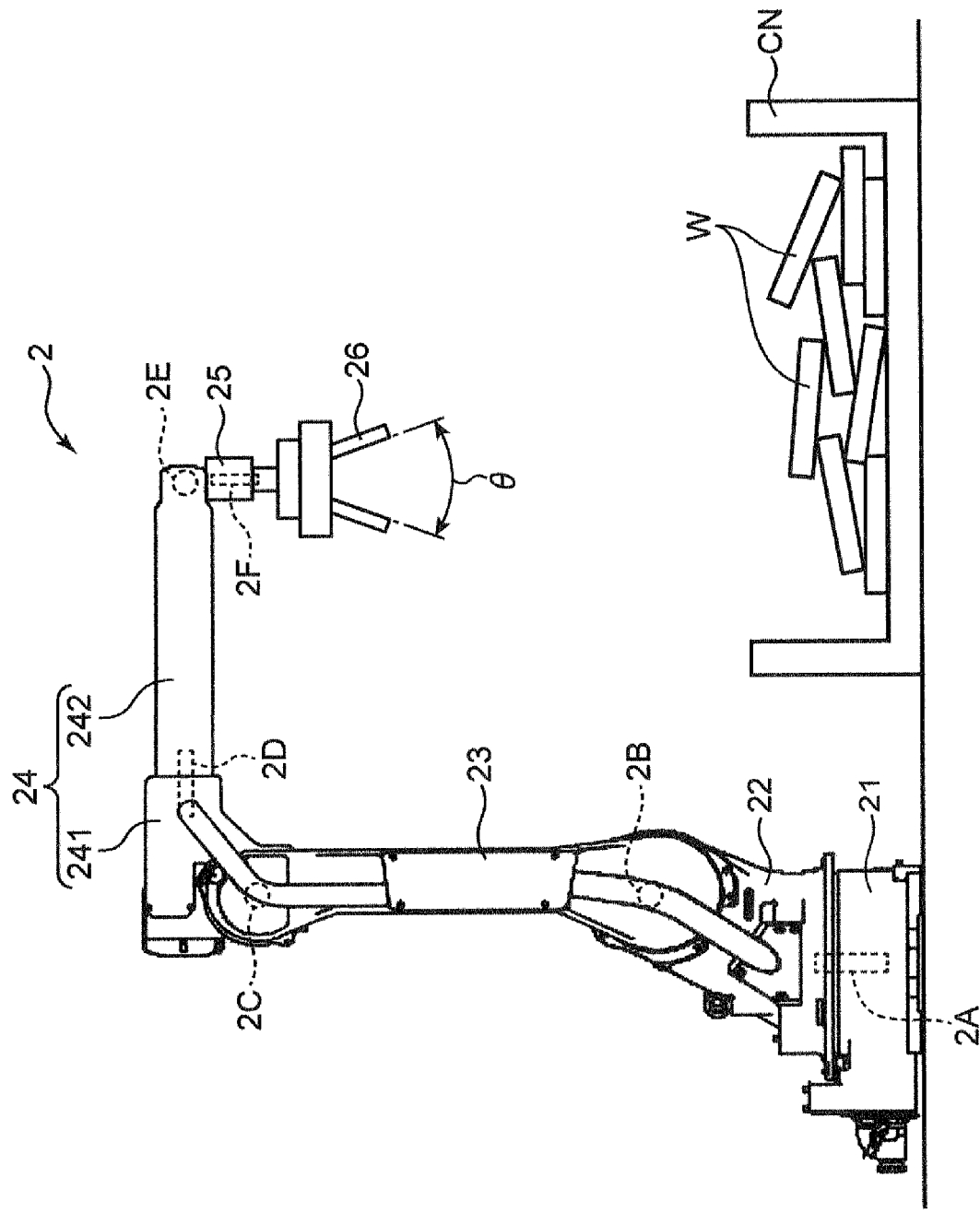
FIG. 2 is a figure illustrating an example of a robot included in the robot system.

The robot 2 will be described with reference to FIG. 2. FIG. 2 is a figure illustrating an example of the robot 2 included in the robot system 1. The robot 2 is a robot for picking out, from a container CN containing a plurality of randomly stacked workpieces W, the workpiece W. The container CN has a form of a bottomed sleeve with a top opening. The robot 2 picks out the workpiece W through the top opening of the container CN.

The robot 2 is not particularly limited to a certain type and may be any robot that includes a hand unit that can pick out the workpiece W from the container CN. For example, the robot 2 may be a vertical articulated robot, a horizontal articulated robot, or a dual-arm articulated robot. A configuration of a six-axis vertical articulated robot illustrated in FIG. 2 will be described below as an example of the robot 2. The number of axes of the vertical articulated robot is not limited to six. The vertical articulated robot may have any number of axes. The robot 2 includes a base unit 21, a body unit 22, a first arm 23, a second arm 24, a wrist unit 25, and a hand unit 26.

The base unit 21 is fixed on a floor or a base, for example, and has a form of a box that houses a driving motor (not shown), for example. The body unit 22 is provided on an upper face of the base unit 21 and is rotatable in both normal and reverse directions about a first axis 2A extending along a vertical direction (up-and-down direction). The first arm 23 is an arm member having a predetermined length and is attached to the body unit 22 by an end portion, regarding a longitudinal direction, of the first arm 23 via a second axis 2B extending along a horizontal direction. The first arm 23 is rotatable in both normal and reverse directions about the second axis 2B.

The second arm 24 includes an arm base 241 and an arm unit 242. The arm base 241 is a base section of the second arm 24 and is attached to another end portion, regarding the longitudinal direction, of the first arm 23 via a third axis 2C extending along a horizontal direction parallel to the second axis 2B. The arm base 241 is rotatable in both normal and reverse directions about the third axis 2C. The arm unit 242 is an arm member having a predetermined length and is attached to the arm base 241 by an end portion, regarding a longitudinal direction, of the arm unit 242 via a fourth axis 2D perpendicular to the third axis 2C. The arm unit 242 is rotatable in both normal and reverse directions about the fourth axis 2D.

The wrist unit 25 is attached to another end portion, regarding the longitudinal direction, of the arm unit 242 via a fifth axis 2E horizontally extending parallel to the second axis 2B and the third axis 2C. The wrist unit 25 is rotatable in both normal and reverse directions about the fifth axis 2E.

The hand unit 26 is a portion at which the robot 2 picks out the workpiece W from the container CN. The hand unit 26 is attached to the wrist unit 25 via a sixth axis 2F vertical to the fifth axis 2E. The hand unit 26 is rotatable in both normal and reverse directions about the sixth axis 2F. The hand unit 26 is not particularly limited to a certain type and may have any structure that can hold the workpiece W in the container CN. For example, the hand unit 26 may have a structure including a plurality of claws to grab and hold the workpiece W or a structure including an electromagnet or a negative pressure generation device that generates a force to attract the workpiece W. In the embodiment, the hand unit 26 has a structure including a plurality of claws and grabs the workpiece W in the container CN to pick out the workpiece W.

The image capturing device 3 is a device that captures an image of an inside of the container CN from above, the image including all of a plurality of workpieces W contained in the container CN, and outputs image data including position data of the workpieces W. In the embodiment, the image capturing device 3 is a three dimensional measuring device such as a three dimensional vision sensor including a camera 31 and an image processing unit 32 as illustrated in FIG. 1. The camera 31 captures an image of the inside of the container CN from above to obtain an image including an image region of each of a plurality of workpieces W contained in the container CN. The image processing unit 32 processes the image obtained by the camera 31 to generate image data including three dimensional position information of each of the workpieces W. The three dimensional position information of each workpiece is represented by, for example, a coordinate value (X, Y, Z) of an XYZ orthogonal coordinate system. The XYZ orthogonal coordinate system is a coordinate system fixed to include a horizontal plane including X axis and Y axis (XY plane) and Z axis normal to the XY plane. The image data that is output from the image capturing device 3 is input to a displaced amount observing unit 63 and a behavior determining unit 71 included in the machine learning device 5 described later.

The controlling device 4 controls an action of the robot 2 and an operation of the image capturing device 3. The controlling device 4 controls the action of the robot 2 and the operation of the image capturing device 3 based on pieces of information generated by the behavior determining unit 71 and an order setting unit 72 included in the machine learning device 5 described later.

[Configuration of Machine Learning Device]

The machine learning device 5 will now be described. As illustrated in FIG. 1, the machine learning device 5 includes a learn processing unit 6 that performs learn processing of learning (by machine learning) the action of the robot 2, and a learn reflective processing unit 7 that performs learn reflective processing of reflecting a result of the learning in the action of the robot 2. A method of learning performed by the machine learning device 5 is not particularly limited. For example, "supervised learning", "unsupervised learning", or "reinforcement learning" may be employed. In the embodiment, a Q-learning method, which is a reinforcement learning, is employed as a method of learning by the machine learning device 5. The Q-learning is such a method that a continuous action of the robot 2 is divided into a plurality of states and a high-value behavior of the robot 2 that can get a reward is learned through the sequentially changing states of the behavior of the robot 2. The Q-learning as the reinforcement learning performed by the machine learning device 5 can be realized using, for example, a neural network. The neural network has a structure like that of a human brain with multiple layered logic circuits each having a function like that of a neuron (neuron cell) of a human brain.

<Learn Processing Unit>

The learn processing unit 6 is a part that performs learn processing of learning the action of the robot 2 and includes a state observing unit 61, a behavior observing unit 62, the displaced amount observing unit 63, and a learning unit 64.

(State Observing Unit)

Figure 3:
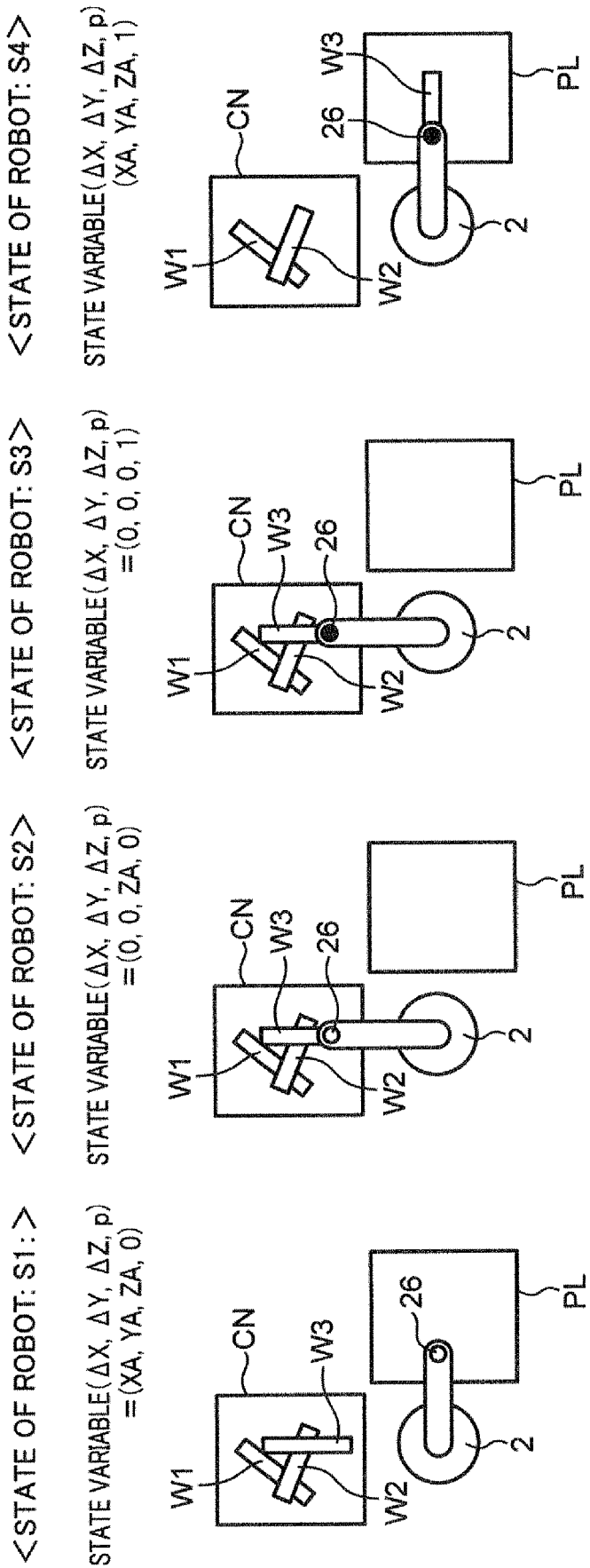
FIG. 3 is a figure for explaining an operation of a state observing unit of a machine learning device included in the robot system.

FIG. 3 is a figure for explaining an operation of the state observing unit 61. FIG. 3 illustrates a state of the robot 2 and the container CN viewed from above, where three workpieces W1, W2, and W3 are randomly stacked in the container CN. The robot 2 performs a continuous action to pick out the targeted workpiece W3 from the container CN by the hand unit 26 and place the picked out workpiece W3 on a pallet PL. The state observing unit 61 observes the state of the robot 2, dividing the continuous action of the robot 2 into a plurality of states.

The number of states of the robot 2 observed by the state observing unit 61 is not particularly limited. In FIG. 3, four states, which are state S1, state S2, state S3, and state S4 are illustrated. In state S1, the body unit 22, the first arm 23, the second arm 24, the wrist unit 25, and the hand unit 26 of the robot 2 are adjusted to each posture so as the hand unit 26 to be at a predetermined position above the pallet PL. In state S2, the workpiece W3, targeted to be grabbed, in the container CN is about to be grabbed by the hand unit 26, and the body unit 22, the first arm 23, the second arm 24, the wrist unit 25, and the hand unit 26 of the robot 2 are adjusted to each posture so as the hand unit 26 to be at a predetermined position just above the workpiece W3. In state S3, the body unit 22, the first arm 23, the second arm 24, the wrist unit 25, and the hand unit 26 of the robot 2 are adjusted to each posture so as the hand unit 26 to grab the workpiece W3, targeted to be grabbed, in the container CN. In state S4, the body unit 22, the first arm 23, the second arm 24, the wrist unit 25, and the hand unit 26 of the robot 2 are adjusted to each posture so as to place the workpiece W3 grabbed by the hand unit 26 on the pallet PL. The robot 2 continuously changes the state from state S1, state S2, state S3, and state S4 in this order to pick out the targeted workpiece W3 from the container CN and place the picked out workpiece W3 on the pallet PL by the hand unit 26.

The state of the robot 2 is defined by a state variable ($\Delta X$, $\Delta Y$, $\Delta Z$, p). The state variable ($\Delta X$, $\Delta Y$, $\Delta Z$, p) changes as the state of the robot 2 changes.

In the XYZ orthogonal coordinate system, an X coordinate value related to the position of the workpiece W3, which is targeted to be grabbed by the hand unit 26, in the container CN is taken as a reference value (hereinafter referred to as "X reference value"). The "$\Delta X$" of the state variable indicates a difference in the X coordinate value related to the position of the hand unit 26 (hereinafter referred to as "hand X value") from the X reference value. In the XYZ orthogonal coordinate system, a Y coordinate value related to the position of the workpiece W3, which is targeted to be grabbed by the hand unit 26, in the container CN is taken as a reference value (hereinafter referred to as "Y reference value"). The "$\Delta Y$" of the state variable indicates a difference in the Y coordinate value related to the position of the hand unit 26 (hereinafter referred to as "hand Y value") from the Y reference value. In the XYZ orthogonal coordinate system, a Z coordinate value related to the position of the workpiece W3, which is targeted to be grabbed by the hand unit 26, in the container CN is taken as a reference value (hereinafter referred to as "Z reference value"). The "$\Delta Z$" of the state variable indicates a difference in the Z coordinate value related to the position of the hand unit 26 (hereinafter referred to as "hand Z value") from the Z reference value. The "p" of the state variable indicates whether the hand unit 26 is grabbing the workpiece W3. The "p" of the state variable is "1" if the hand unit 26 is grabbing the workpiece W3 and "0; zero" if the hand unit 26 is not grabbing the workpiece W3.

If the state of the robot 2 is state S1, the hand unit 26 is remote from the container CN along the coordinate axis directions of X axis, Y axis, and Z axis and not grabbing the workpiece W3. For the state variable ($\Delta X$, $\Delta Y$, $\Delta Z$, p) defining state S1 of the robot 2, "$\Delta X$", "$\Delta Y$", and "$\Delta Z$" respectively indicate predetermined values of "XA", "YA", and "ZA" and "p" indicates "0; zero".

When the state of the robot 2 is state S2, the hand unit 26 is not remote from the container CN along the directions of X axis and Y axis but remote from the container CN along the direction of Z axis, and not grabbing the workpiece W3. For the state variable ($\Delta X$, $\Delta Y$, $\Delta Z$, p) defining state S2 of the robot 2, "$\Delta X$" and "$\Delta Y$" each indicates "0; zero", "$\Delta Z$" indicates a predetermined value of "ZA", and "p" indicates "0; zero".

If the state of the robot 2 is state S3, the hand unit 26 is not remote from the container CN along the coordinate axis directions of X axis, Y axis, and Z axis, and grabbing the workpiece W3. For the state variable ($\Delta X$, $\Delta Y$, $\Delta Z$, p) defining state S3 of the robot 2, "$\Delta X$", "$\Delta Y$", and "$\Delta Z$" each indicates "0; zero", and "p" indicates "1".

If the state of the robot 2 is state S4, the hand unit 26 is remote from the container CN along the coordinate axis directions of X axis, Y axis, and Z axis, and grabbing the workpiece W3. For the state variable ($\Delta X$, $\Delta Y$, $\Delta Z$, p) defining state S4 of the robot 2, "$\Delta X$", "$\Delta Y$", and "$\Delta Z$" respectively indicate the predetermined values of "XA", "YA", and "ZA", and "p" indicates "1".

Based on the state variable ($\Delta X$, $\Delta Y$, $\Delta Z$, p) which changes along with the change in the state of the robot 2, the state observing unit 61 can recognize in which state the robot 2 is among state S1, state S2, state S3, and state S4. When the state of the robot 2 is either state S1, state S2, or state S3, there is a plurality of sub-states with different postures of the body unit 22, the first arm 23, the second arm 24, the wrist unit 25, or the hand unit 26, for example. When the state of the robot 2 is either state S1, state S2, or state S3, the state observing unit 61 also observes the sub-state. For state S4 which is the final targeted state of the robot 2 to place the workpiece W3 grabbed by the hand unit 26 on the pallet PL, there is no sub-state like in state S1, state S2, and state S3.

(Behavior Observing Unit)

Figure 4:
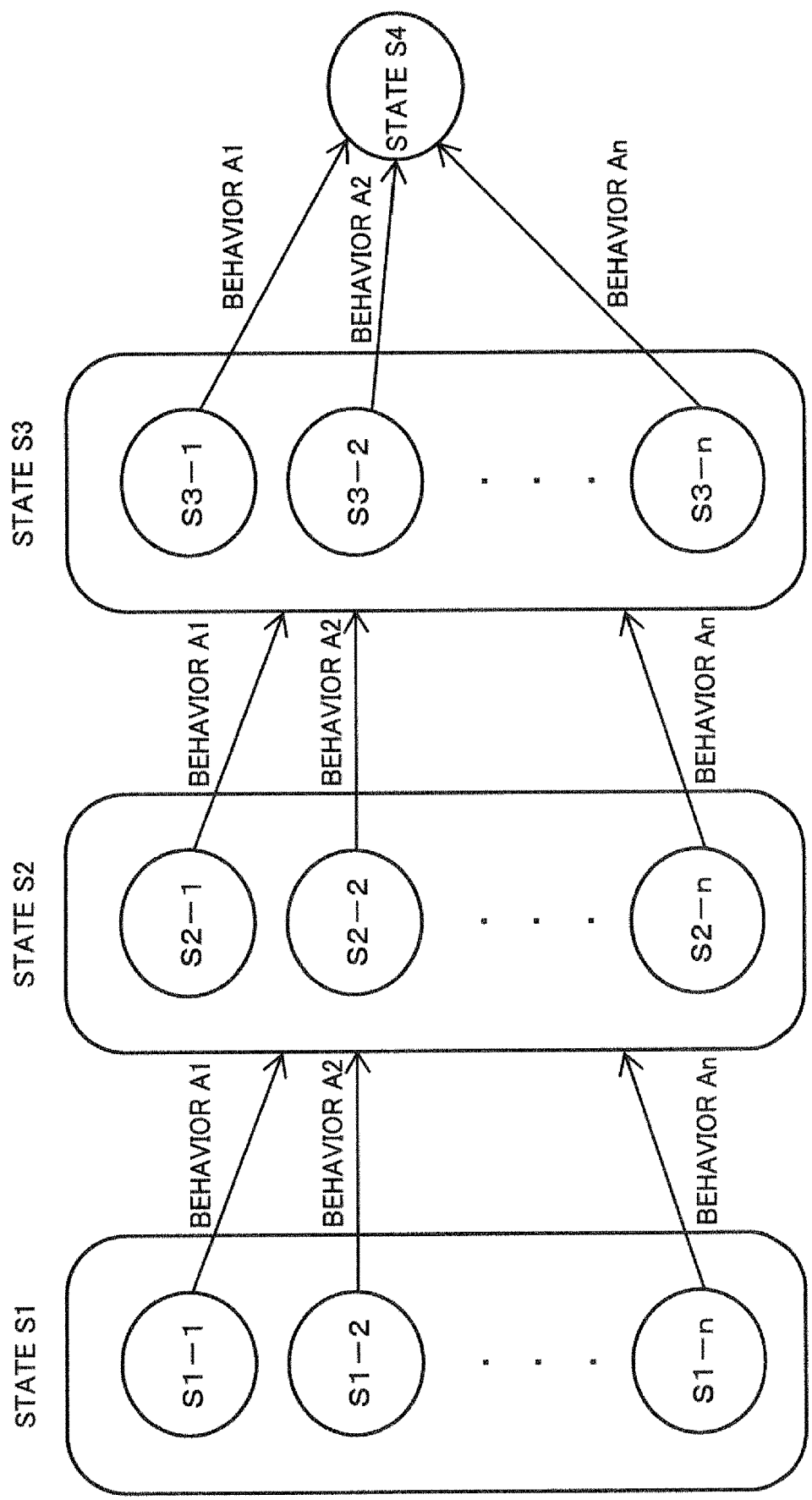
FIG. 4 is a figure for explaining an operation of a behavior observing unit of the machine learning device.

FIG. 4 is a figure for explaining an operation of the behavior observing unit 62. As for the state of the robot 2, FIG. 4 illustrates that a plurality of sub-states "S1-1, S1-2, . . . , and S1-n" exists in state S1, a plurality of sub-states "S2-1, S2-2, . . . , and S2-n" exists in state S2, and a plurality of sub-states "S3-1, S3-2, . . . , and S3-n" exists in state S3.

The behavior observing unit 62 observes a behavior pattern of the robot 2 changing the state. In more detail, the behavior pattern of the robot 2 observed by the behavior observing unit 62 is a behavior pattern of the state of the robot 2 changing from state S1 to state S2, a behavior pattern of the state changing from state S2 to state S3, and a behavior pattern of the state changing from state S3 to state S4. The robot 2 may take a plurality of behavior patterns when the state changes (behavior A1, behavior A2, . . . , and behavior An), the number of patterns depending on the number of sub-states in each of the state S1, state S2, and state S3. When the state of the robot 2 changes from state S2 to state S3, a pick-out action of picking out the targeted workpiece W from the container CN is performed by the hand unit 26.

Figure 5:
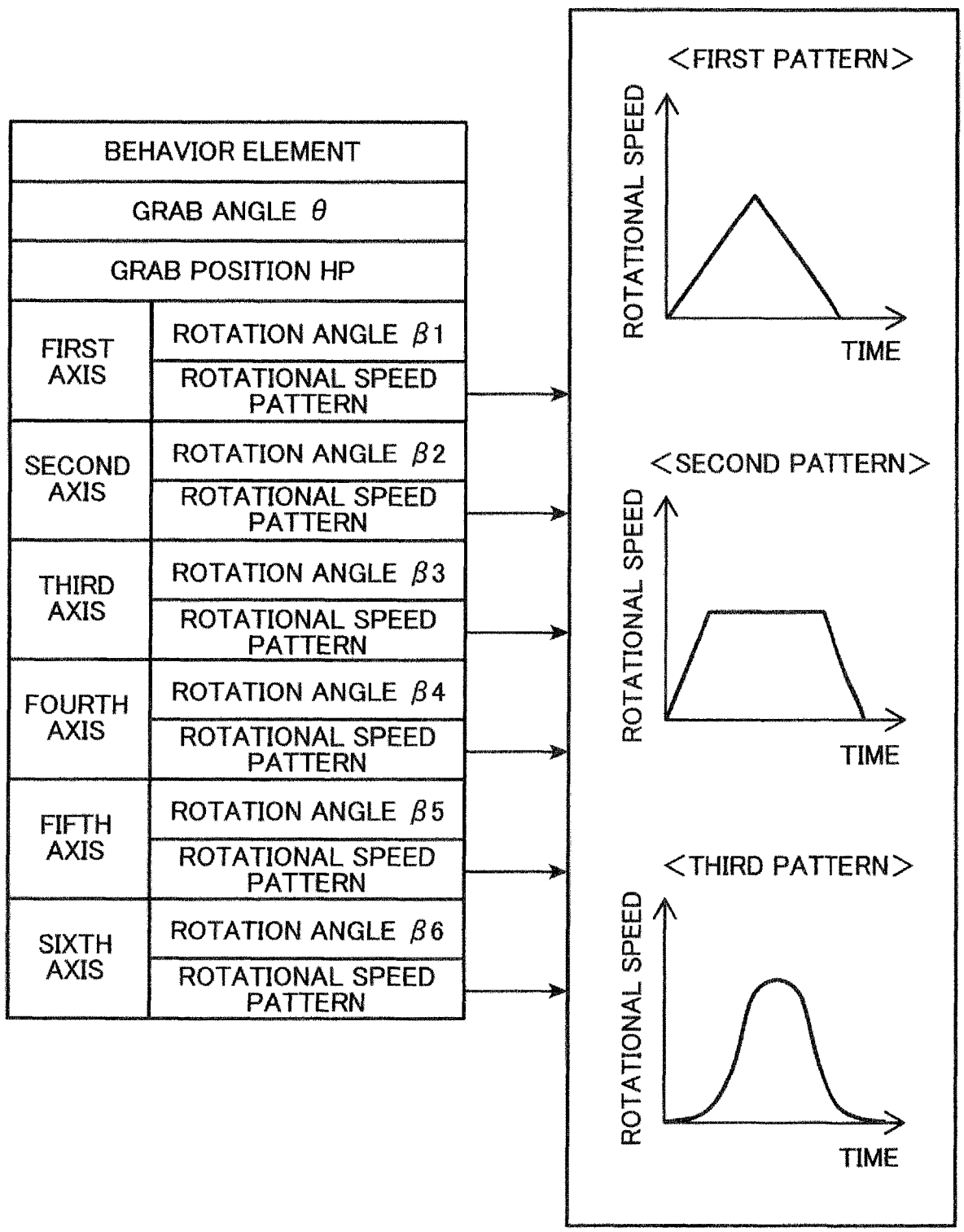
FIG. 5 is a figure for explaining a behavior element defining a behavior pattern of the robot.

Behavior elements that define the behavior pattern of the robot 2 observed by the behavior observing unit 62 include, as illustrated in FIG. 5, a grab angle θ, a grab position HP, a rotation angle β1 about the first axis 2A, a rotational speed pattern about the first axis 2A, a rotation angle β2 about the second axis 2B, a rotational speed pattern about the second axis 2B, a rotation angle β3 about the third axis 2C, a rotational speed pattern about the third axis 2C, a rotation angle β4 about the fourth axis 2D, a rotational speed pattern about the fourth axis 2D, a rotation angle β5 about the fifth axis 2E, a rotational speed pattern about the fifth axis 2E, a rotation angle β6 about the sixth axis 2F, and a rotational speed pattern about the sixth axis 2F. As described above, the number of axes of the robot 2, which is a vertical articulated robot, is not limited to six and may be any number. Thus, the rotation angles and the rotational speed patterns about the respective axes included in the behavior elements that define the behavior pattern of the robot 2 depend on the number of axes.

The grab angle θ is an angle between two claws for grabbing the workpiece W by the hand unit 26 (see FIG. 2). The grab position HP indicates a position at which the targeted workpiece W is grabbed when the hand unit 26 picks out the targeted workpiece W. The rotation angle β1 about the first axis 2A indicates the rotation angle by which the body unit 22 rotates about the first axis 2A when the state of the robot 2 changes. The body unit 22 is rotatable about the first axis 2A in both normal and reverse directions. The rotation angle β1 takes a "positive; plus" rotation angle when the body unit 22 rotates in the normal direction and a "negative; minus" rotation angle when the body unit 22 rotates in the reverse direction. The rotation angle β2 about the second axis 2B indicates the rotation angle by which the first arm 23 rotates about the second axis 2B when the state of the robot 2 changes. The first arm 23 is rotatable about the second axis 2B in both normal and reverse directions. The rotation angle β2 takes a "positive; plus" rotation angle when the first arm 23 rotates in the normal direction and a "negative; minus" rotation angle when the first arm 23 rotates in the reverse direction. The rotation angle β3 about the third axis 2C indicates the rotation angle by which the arm base 241 rotates about the third axis 2C when the state of the robot 2 changes. The arm base 241 is rotatable about the third axis 2C in both normal and reverse directions. The rotation angle β3 takes a "positive; plus" rotation angle when the arm base 241 rotates in the normal direction and a "negative; minus" rotation angle when the arm base 241 rotates in the reverse direction.

The rotation angle β4 about the fourth axis 2D indicates the rotation angle by which the arm unit 242 rotates about the fourth axis 2D when the state of the robot 2 changes. The arm unit 242 is rotatable about the fourth axis 2D in both normal and reverse directions. The rotation angle β4 takes a "positive; plus" rotation angle when the arm unit 242 rotates in the normal direction and a "negative; minus" rotation angle when the arm unit 242 rotates in the reverse direction. The rotation angle β5 about the fifth axis 2E indicates the rotation angle by which the wrist unit 25 rotates about the fifth axis 2E when the state of the robot 2 changes. The wrist unit 25 is rotatable about the fifth axis 2E in both normal and reverse directions. The rotation angle β5 takes a "positive; plus" rotation angle when the wrist unit 25 rotates in the normal direction and a "negative; minus" rotation angle when the wrist unit 25 rotates in the reverse direction. The rotation angle β6 about the sixth axis 2F indicates the rotation angle by which the hand unit 26 rotates about the sixth axis 2F when the state of the robot 2 changes. The hand unit 26 is rotatable about the sixth axis 2F in both normal and reverse directions. The rotation angle β6 takes a "positive; plus" rotation angle when the hand unit 26 rotates in the normal direction and a "negative; minus" rotation angle when the hand unit 26 rotates in the reverse direction.

The rotational speed patterns of the axes 2A to 2F each indicates a pattern of the rotational speed about each axis and are categorized into a first pattern, a second pattern, and a third pattern illustrated in FIG. 5. The first pattern of the rotational speed has two regions which are an increasing region where the rotational speed linearly increases with time and a decreasing region where the rotational speed linearly decreases with time from the last rotational speed in the increasing region. The second pattern of the rotational speed has three regions which are an increasing region where the rotational speed linearly increases with time, a constant speed region where the rotational speed is kept constant at the last rotational speed in the increasing region for a period of time, and a decreasing region where the rotational speed linearly decreases with time from the last rotational speed in the constant speed region. The third pattern of the rotational speed has two regions which are an increasing region where the rotational speed curvilinearly increases with time and a decreasing region where the rotational speed curvilinearly decreases with time from the last rotational speed in the increasing region.

The behavior observing unit 62 can recognize, based on the behavior elements, the behavior pattern of the robot 2 to change the state.

(Displaced Amount Observing Unit)

Figure 6:
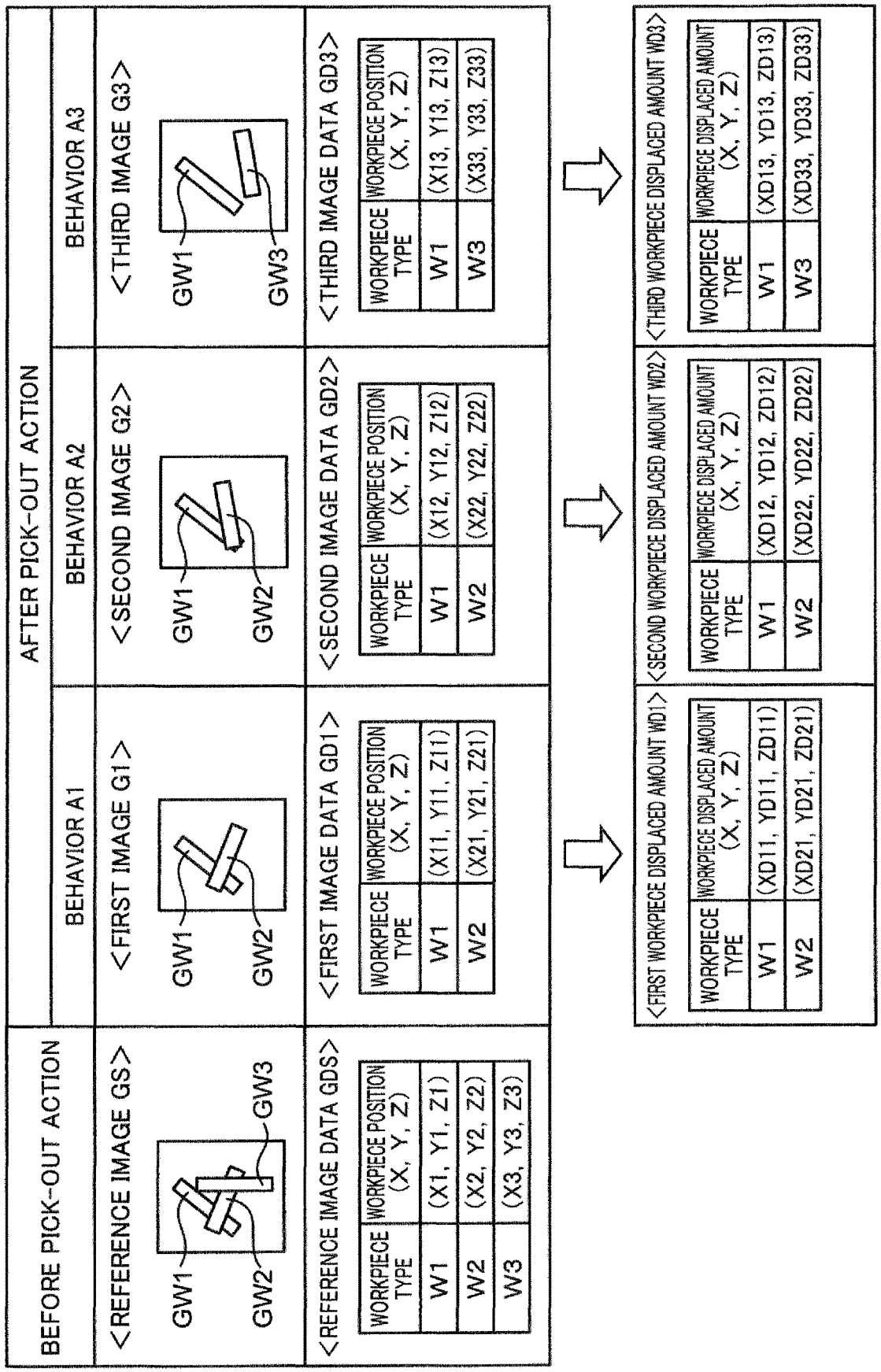
FIG. 6 is a figure for explaining an operation of a displaced amount observing unit of the machine learning device.

FIG. 6 is a figure for explaining an operation of the displaced amount observing unit 63. The displaced amount observing unit 63 observes a workpiece displaced amount caused by the change in the state of the robot 2 from state S2 to state S3, that is, resulting from the pick-out action of the hand unit 26 picking out the targeted workpiece W from the container CN. The workpiece displaced amount indicates a displaced amount of each of the untargeted workpieces W, except the targeted workpiece W picked out by the hand unit 26, in the container CN. The displaced amount observing unit 63 observes the workpiece displaced amounts of the untargeted workpieces W based on pieces of image data captured before and after the pick-out action of the robot 2 and output from the image capturing device 3.

In the example illustrated in FIG. 6, a reference image GS is obtained by an image capturing operation performed by the camera 31 of the image capturing device 3 before the robot 2 performs the pick-out action, and the image processing unit 32 performs image processing on the reference image GS to generate reference image data GDS. The reference image GS includes image regions related to three workpieces W1, W2, and W3 that are randomly stacked and contained in the container CN, the image regions being an image region GW1 corresponding to the workpiece W1, an image region GW2 corresponding to the workpiece W2, and an image region GW3 corresponding to the workpiece W3. The reference image data GDS includes information related to a coordinate value (X1, Y1, Z1) that is three dimensional position information of the workpiece W1, information related to a coordinate value (X2, Y2, Z2) that is three dimensional position information of the workpiece W2, and information related to a coordinate value (X3, Y3, Z3) that is three dimensional position information of the workpiece W3.

In the example illustrated in FIG. 6, a first image G1, a second image G2, and a third image G3 are obtained by the image capturing operation performed by the camera 31 of the image capturing device 3 after the robot 2 performs the pick-out action, and the image processing unit 32 performs image processing respectively on images G1, G2, and G3 to generate the first image data GD1, the second image data GD2, and the third image data GD3.

The first image G1 and the first image data GD1 respectively show an image and image data captured after the robot 2 has picked out the workpiece W3 by the behavior pattern A1. The first image G1 includes image regions for the workpieces W1 and W2 captured after the workpiece W3 has been picked out by the behavior pattern A1, the image regions being an image region GW1 corresponding to the workpiece W1 and an image region GW2 corresponding to the workpiece W2. The first image data GD1 includes information related to a coordinate value (X11, Y11, Z11) that is three dimensional position information of the workpiece W1, and information related to a coordinate value (X21, Y21, Z21) that is three dimensional position information of the workpiece W2.

The second image G2 and the second image data GD2 respectively show an image and image data captured after the robot 2 has picked out the workpiece W3 by the behavior pattern A2. The second image G2 includes image regions for the workpieces W1 and W2 captured after the workpiece W3 has been picked out by the behavior pattern A2, the image regions being an image region GW1 corresponding to the workpiece W1 and an image region GW2 corresponding to the workpiece W2. The second image data GD2 includes information related to a coordinate value (X12, Y12, Z12) that is three dimensional position information of the workpiece W1, and information related to a coordinate value (X22, Y22, Z22) that is three dimensional position information of the workpiece W2.

The third image G3 and the third image data GD3 respectively show an image and image data captured after the robot 2 has picked out the workpiece W2 by the behavior pattern A3. The third image G3 includes image regions for the workpieces W1 and W3 captured after the workpiece W2 has been picked out by the behavior pattern A3, the image regions being an image region GW1 corresponding to the workpiece W1 and an image region GW3 corresponding to the workpiece W3. The third image data GD3 includes information related to a coordinate value (X13, Y13, Z13) that is three dimensional position information of the workpiece W1, and information related to a coordinate value (X33, Y33, Z33) that is three dimensional position information of the workpiece W3.

The displaced amount observing unit 63 observes, based on the reference image data GDS and the first image data GD1, a first workpiece displaced amount WD1 indicating the displaced amounts of the workpieces W1 and W2 in the container CN resulting from picking out the workpiece W3 by the behavior pattern A1. The first workpiece displaced amount WD1 includes a workpiece displaced amount (XD11, YD11, ZD11) of the workpiece W1 and a workpiece displaced amount (XD21, YD21, ZD21) of the workpiece W2. "XD11" of the workpiece displaced amount of the workpiece W1 indicates a difference between X coordinate value "X1" in the three dimensional position information of the workpiece W1 included in the reference image data GDS and X coordinate value "X11" in the three dimensional position information of the workpiece W1 included in the first image data GD1. "YD11" of the workpiece displaced amount of the workpiece W1 indicates a difference between Y coordinate value "Y1" in the three dimensional position information of the workpiece W1 included in the reference image data GDS and Y coordinate value "Y11" in the three dimensional position information of the workpiece W1 included in the first image data GD1. "ZD11" of the workpiece displaced amount of the workpiece W1 indicates a difference between Z coordinate value "Z1" in the three dimensional position information of the workpiece W1 included in the reference image data GDS and Z coordinate value "Z11" in the three dimensional position information of the workpiece W1 included in the first image data GD1.

Similarly, "XD21" of the workpiece displaced amount of the workpiece W2 indicates a difference between X coordinate value "X2" in the three dimensional position information of the workpiece W2 included in the reference image data GDS and X coordinate value "X21" in the three dimensional position information of the workpiece W2 included in the first image data GD1. "YD21" of the workpiece displaced amount of the workpiece W2 indicates a difference between Y coordinate value "Y2" in the three dimensional position information of the workpiece W2 included in the reference image data GDS and Y coordinate value "Y21" in the three dimensional position information of the workpiece W2 included in the first image data GD1. "ZD21" of the workpiece displaced amount of the workpiece W2 indicates a difference between Z coordinate value "Z2" in the three dimensional position information of the workpiece W2 included in the reference image data GDS and Z coordinate value "Z21" in the three dimensional position information of the workpiece W2 included in the first image data GD1.

As is apparent from comparing the reference image GS with the first image G1, the positions of the workpieces W1 and W2 after picking out the workpiece W3 by the behavior pattern A1 have changed little respectively from the positions of the workpieces W1 and W2 before picking out the workpiece W3. Thus, the values of the workpiece displaced amount (XD11, YD11, ZD11) of the workpiece W1 and the values of the workpiece displaced amount (XD21, YD21, ZD21) of the workpiece W2 included in the first workpiece displaced amount WD1 observed by the displaced amount observing unit 63 each takes a value close to "0; zero".

The displaced amount observing unit 63 observes, based on the reference image data GDS and the second image data GD2, a second workpiece displaced amount WD2 indicating the displaced amounts of the workpieces W1 and W2 in the container CN resulting from picking out the workpiece W3 by the behavior pattern A2. The second workpiece displaced amount WD2 includes a workpiece displaced amount (XD12, YD12, ZD12) of the workpiece W1 and a workpiece displaced amount (XD22, YD22, ZD22) of the workpiece W2. "XD12" of the workpiece displaced amount of the workpiece W1 indicates a difference between X coordinate value "X1" in the three dimensional position information of the workpiece W1 included in the reference image data GDS and X coordinate value "X12" in the three dimensional position information of the workpiece W1 included in the second image data GD2. "YD12" of the workpiece displaced amount of the workpiece W1 indicates a difference between Y coordinate value "Y1" in the three dimensional position information of the workpiece W1 included in the reference image data GDS and Y coordinate value "Y12" in the three dimensional position information of the workpiece W1 included in the second image data GD2. "ZD12" of the workpiece displaced amount of the workpiece W1 indicates a difference between Z coordinate value "Z1" in the three dimensional position information of the workpiece W1 included in the reference image data GDS and Z coordinate value "Z12" in the three dimensional position information of the workpiece W1 included in the second image data GD2.

Similarly, "XD22" of the workpiece displaced amount of the workpiece W2 indicates a difference between X coordinate value "X2" in the three dimensional position information of the workpiece W2 included in the reference image data GDS and X coordinate value "X22" in the three dimensional position information of the workpiece W2 included in the second image data GD2. "YD22" of the workpiece displaced amount of the workpiece W2 indicates a difference between Y coordinate value "Y2" in the three dimensional position information of the workpiece W2 included in the reference image data GDS and Y coordinate value "Y22" in the three dimensional position information of the workpiece W2 included in the second image data GD2. "ZD22" of the workpiece displaced amount of the workpiece W2 indicates a difference between Z coordinate value "Z2" in the three dimensional position information of the workpiece W2 included in the reference image data GDS and Z coordinate value "Z22" in the three dimensional position information of the workpiece W2 included in the second image data GD2.

As is apparent from comparing the reference image GS with the second image G2, the position of the workpiece W1 after picking out the workpiece W3 by the behavior pattern A2 has changed little from the position of the workpiece W1 before picking out the workpiece W3, whereas the position of the workpiece W2 has changed. As for the workpiece displaced amounts of the workpieces W1 and W2 included in the second workpiece displaced amount WD2 observed by the displaced amount observing unit 63, the values of the workpiece displaced amount (XD12, YD12, ZD12) of the workpiece W1 each takes a value close to "0; zero", whereas the values of the workpiece displaced amount (XD22, YD22, ZD22) of the workpiece W2 each takes a value corresponding to the displacement of the workpiece W2.

The displaced amount observing unit 63 observes, based on the reference image data GDS and the third image data GD3, a third workpiece displaced amount WD3 indicating the displaced amounts of the workpieces W1 and W3 in the container CN caused by picking out the workpiece W2 by the behavior pattern A3. The third workpiece displaced amount WD3 includes a workpiece displaced amount (XD13, YD13, ZD13) of the workpiece W1 and a workpiece displaced amount (XD33, YD33, ZD33) of the workpiece W3. "XD13" of the workpiece displaced amount of the workpiece W1 indicates a difference between X coordinate value "X1" in the three dimensional position information of the workpiece W1 included in the reference image data GDS and X coordinate value "X13" in the three dimensional position information of the workpiece W1 included in the third image data GD3. "YD13" of the workpiece displaced amount of the workpiece W1 indicates a difference between Y coordinate value "Y1" in the three dimensional position information of the workpiece W1 included in the reference image data GDS and Y coordinate value "Y13" in the three dimensional position information of the workpiece W1 included in the third image data GD3. "ZD13" of the workpiece displaced amount of the workpiece W1 indicates a difference between Z coordinate value "Z1" in the three dimensional position information of the workpiece W1 included in the reference image data GDS and Z coordinate value "Z13" in the three dimensional position information of the workpiece W1 included in the third image data GD3.

Similarly, "XD33" of the workpiece displaced amount of the workpiece W3 indicates a difference between X coordinate value "X3" in the three dimensional position information of the workpiece W3 included in the reference image data GDS and X coordinate value "X33" in the three dimensional position information of the workpiece W3 included in the third image data GD3. "YD33" of the workpiece displaced amount of the workpiece W3 indicates a difference between Y coordinate value "Y3" in the three dimensional position information of the workpiece W3 included in the reference image data GDS and Y coordinate value "Y33" in the three dimensional position information of the workpiece W3 included in the third image data GD3. "ZD33" of the workpiece displaced amount of the workpiece W3 indicates a difference between Z coordinate value "Z3" in the three dimensional position information of the workpiece W3 included in the reference image data GDS and Z coordinate value "Z33" in the three dimensional position information of the workpiece W3 included in the third image data GD3.

As is apparent from comparing the reference image GS with the third image G3, the position of the workpiece W1 after picking out the workpiece W2 by the behavior pattern A3 has changed little from the position of the workpiece W1 before picking out the workpiece W2, whereas the position of the workpiece W3 has changed. As for the workpiece displaced amounts of the workpieces W1 and W3 included in the third workpiece displaced amount WD3 observed by the displaced amount observing unit 63, the values of the workpiece displaced amount (XD13, YD13, ZD13) of the workpiece W1 each takes a value close to "0; zero", whereas the values of the workpiece displaced amount (XD33, YD33, ZD33) of the workpiece W3 each takes a value corresponding to the displacement of the workpiece W3.

The configuration of the displaced amount observing unit 63 is not limited to that observes the workpiece displaced amount based on pieces of image data of actual images captured before and after the pick-out action of the robot 2. It may be configured to observe the workpiece displaced amount based on pieces of image data using, for example, VR (virtual) images. That is, the displaced amount observing unit 63 may be configured to reproduce an arrangement of workpieces W before and after the pick-out action of the robot 2 in a VR space, calculate three dimensional position information using VR images of the workpieces W reproduced in the VR space, and obtain workpiece displaced amounts based on the result of the calculation.

(Learning Unit)

Figure 7:
FIG. 7 is a figure for explaining an operation of a learning unit of the machine learning device.

FIG. 7 is a figure for explaining an operation of the learning unit 64. The learning unit 64 learns an optimum behavior pattern of the robot 2 to change the state of the robot 2. That, is, the learning unit 64 learns an optimum behavior pattern of the robot 2 for changing the state of the robot 2 from state S1 to state S2, an optimum behavior pattern of the robot 2 for changing the state from state S2 to state S3, and an optimum behavior pattern of the robot 2 for changing the state from state S3 to state S4. Hereinafter, detailed description will be made for the robot 2 learning the behavior pattern for changing the state from state S2 to state S3, assuming that the optimum behavior pattern of the robot 2 for changing the state of the robot 2 from state S1 to state S2 and the optimum behavior pattern of the robot 2 for changing the state from state S3 to state S4 have already been learned. That is, described below is the robot 2 learning the behavior pattern for the hand unit 26 to pick out the targeted workpiece W from the container CN.

The learning unit 64 learns an influence rate on the untargeted workpieces W with the associated behavior pattern of the robot 2 observed by the behavior observing unit 62 for picking out the targeted workpiece W from the container CN by the hand unit 26, the influence rate depending on the workpiece displaced amount observed by the displaced amount observing unit 63. The learning unit 64 learns, based on supervised data TD in which the behavior pattern of the robot 2 and the workpiece displaced amount are associated with each other, the influence rate on the untargeted workpiece W for picking out the targeted workpiece W. In the example illustrated in FIG. 7, the supervised data TD is the data in which the behavior pattern A1 is associated with the first workpiece displaced amount WD1, the behavior pattern A2 is associated with the second workpiece displaced amount WD2, and the behavior pattern A3 is associated with the third workpiece displaced amount WD3 as illustrated in FIG. 6.

As illustrated in FIG. 1, the learning unit 64 includes a reward setting unit 641 and a value function updating unit 642.

The reward setting unit 641 sets the influence rate IM on the untargeted workpiece W and a reward R for the behavior pattern of picking out the targeted workpiece W by the robot 2 and observed by the behavior observing unit 63, the influence rate IM and the reward R depending on the workpiece displaced amount. The influence rate IM on the untargeted workpiece W is set to a value correlated to the workpiece displaced amount of the untargeted workpiece W observed by the displaced amount observing unit 62 so as to take a smaller value for a smaller workpiece displaced amount. The reward setting unit 641 gives a reward R of a first value R1 (for example, "100", which is larger than 0 (zero)) for such a behavior pattern of the robot 2 that causes the workpiece displaced amount smaller than a predetermined threshold WDT, and a reward R of a second value R2 (for example, 0 (zero)) smaller than the first value R1 for such a behavior pattern of the robot 2 that causes the workpiece displaced amount equal to or greater than the threshold WDT.

In the example illustrated in FIG. 7, the reward setting unit 641 sets for the behavior pattern A1 corresponding to the first workpiece displaced amount WD1 smaller than the threshold WDT an "IM1" as the influence rate IM corresponding to the first workpiece displaced amount WD1 and gives a reward R of the first value R1 larger than "0; zero". The reward setting unit 641 sets for the behavior pattern A2 corresponding to the second workpiece displaced amount WD2 equal to or larger than the threshold WDT an "IM2" as the influence rate IM corresponding to the second workpiece displaced amount WD2 and gives a reward R of the second value R2 (0; zero). The reward setting unit 641 sets for the behavior pattern A3 corresponding to the third workpiece displaced amount WD3 equal to or larger than the threshold WDT an "IM3" as the influence rate IM corresponding to the third workpiece displaced amount WD3 and gives a reward R of the second value R2 (0; zero).

The value function updating unit 642 updates a value function that defines a value Q(s, a) of the behavior pattern of the robot 2 in accordance with the reward R set by the reward setting unit 641. The value function updating unit 642 updates the value function using an updating formula for updating the value Q(s, a) expressed by formula (1).

[Formula 1]

$$Q(s, a) \approx Q(s, a) + \alpha\left(R(s, a) + \gamma \max_{a'} Q(s', a') - Q(s, a)\right) \quad (1)$$

In the formula (1), "s" indicates a state of the robot 2 (state S2), and "a" indicates a behavior of the robot 2 following a behavior pattern (behavior A1, behavior A2, and behavior A3). The state of the robot 2 changes from state "s" (state S2) to state "s'" (state S3) by the behavior "a". R(s, a) indicates a reward R obtained by the change in the state. The term including "max" indicates the value Q(s', a') multiplied by "γ", where the value Q(s', a') is a value for selecting the most high valued behavior "a'" in the state "s'". "γ" is a parameter called a damping rate taking a value in a range of 0<γ≤1 (for example, 0.9). "α" is a parameter called a learning rate taking a value in a range of 0<α≤1 (for example, 0.1).

The formula (1) represents an updating formula for updating the value Q(s, a) of the behavior "a" in the state "s" based on the reward R(s, a) that is set for the behavior "a" by the reward setting unit 641. That is, the formula (1) indicates that if a sum of the value Q(s', a') of the behavior "a'" in the state "s'" and the reward R(s, a) is larger than the value Q(s, a) of the behavior "a" in the state "s", the value Q(s, a) is increased, and if small, the value Q(s, a) is decreased. That is, the value function updating unit 642 updates the value function using the updating formula expressed by the formula (1) to change the value Q(s, a) of the behavior "a" in a certain state "s" to a value close to the reward R set for the behavior "a" and the value Q(s', a') of the best behavior "a'" in the next state "s'" resulting from the behavior "a".

(Learn Processing Performed by Learn Processing Unit)

As described above, the learn processing unit 6 of the machine learning device 5 includes the state observing unit 61, the behavior observing unit 62, the displaced amount observing unit 63, and the learning unit 64. Learn processing performed by the learn processing unit 6 will be described with reference to a flowchart in FIG. 8.

The displaced amount observing unit 63 obtains reference image data GDS (FIG. 6) that is captured before the pick-out action of the robot 2 and output from the image capturing device 3 (step a1). Then, the state observing unit 61 observes the state of the robot 2 (step a2). In more detail, based on the state variable (ΔX, ΔY, ΔZ, p), which changes along with the change in the state of the robot 2, the state observing unit 61 observes the state of the robot 2 changing from state S2 to state S3. The behavior observing unit 62 observes the behavior pattern of the robot 2 when the state of the robot 2 changes from state S2 to state S3, that is, when the pick-out action of picking out the targeted workpiece W from the container CN is performed by the hand unit 26 (step a3). In more detail, the behavior observing unit 62 observes the behavior pattern of the robot 2 in a state transition period from state S2 to state S3 based on the behavior elements (the grab angle θ, the grab position HP, the rotation angles β1 to β6 of the shafts, and the rotational speed patterns of the shafts).

Then, the displaced amount observing unit 63 obtains image data captured after the robot 2 has performed the pick-out action according to the behavior pattern observed by the behavior observing unit 62 and output from the image capturing device 3 (step a4). Based on the pieces of image data captured before and after the pick-out action of the robot 2 and output from an image capturing device 3, the displaced amount observing unit 63 observes the workpiece displaced amount of the untargeted workpiece W caused by picking out the targeted workpiece W from the container CN (step a5).

Then, the reward setting unit 641 of the learning unit 64 sets the influence rate IM on the untargeted workpiece W with the associated behavior pattern of the robot 2, the influence rate IM depending on the workpiece displaced amount, and determines whether the workpiece displaced amount is smaller than the predetermined threshold WDT (step a6). The reward setting unit 641 gives a reward R larger than "0; zero" for the behavior pattern of the robot 2 of the workpiece displaced amount smaller than the threshold WDT (step a7). The reward setting unit 641 gives a reward R of "0; zero" for the behavior pattern of the robot 2 associated with the workpiece displaced amount equal to or larger than the threshold WDT (step a8).

Then, the value function updating unit 642 of the learning unit 64 updates the value function that defines the value Q(s, a) of the behavior pattern of the robot 2 using the updating formula expressed by the formula (1) (step a9). The processes described by step a1 to step a9 described above are performed by the learn processing unit 6 in one cycle of the learn processing. The learn processing unit 6 determines whether the number of times the learning has been performed has reached a predetermined number (step a10). The processes of step a1 to step a9 are repeated until the number of times the learning has been performed reaches the predetermined number.

In the learn processing unit 6, the behavior pattern of the robot 2 to pick out the targeted workpiece W from the container CN is observed by the behavior observing unit 62, and the workpiece displaced amount of the untargeted workpiece W in the container CN caused by the pick-out action of the robot 2 is observed by the displaced amount observing unit 63. Based on the supervised data TD in which the behavior pattern of the robot 2 is associated with the workpiece displaced amount, the learning unit 64 learns the influence rate IM on the untargeted workpiece with the associated behavior pattern for picking out the targeted workpiece W from the container CN, the influence rate IM depending on the workpiece displaced amount.

The workpiece displaced amount is an index of an effect of an impact force on the untargeted workpiece W and a collapse rate of the untargeted workpieces W caused or resulting from picking out the targeted workpiece W from the container CN. That is, the impact force on the untargeted workpiece W and the collapse rate of the untargeted workpieces W are smaller for a smaller workpiece displaced amount, and the corresponding influence rate IM on the untargeted workpieces W is smaller. Since the learning unit 64 learns the influence rate IM on the untargeted workpiece W with the associated behavior pattern, the influence rate IM depending on the workpiece displaced amount, the learning unit 64 can learn a behavior pattern of the robot 2 of a small influence rate IM on the untargeted workpiece W for picking out the targeted workpiece W from the container CN. Thus, an optimum pick-out action of the robot 2 of a small influence rate on the untargeted workpieces W can be learned to prevent damages to the workpiece W.

Furthermore, the behavior element defining the behavior pattern of the robot 2 observed by the behavior observing unit 62 includes the grab position HP at which the hand unit 26 grabs the one targeted workpiece W when picking out the targeted workpiece W. The behavior pattern of the robot 2 observed by the behavior observing unit 62 constitutes the supervised data TD used by the learning unit 64 when learning the action of the robot 2. Since the grab position HP at which the hand unit 26 grabs the workpiece W is included as an element of the behavior element defining the behavior pattern of the robot 2 and constituting the supervised data TD, the learning unit 64 can learn such a behavior pattern of the robot 2 that takes the grab position HP into consideration to reduce the influence rate IM on the untargeted workpieces W.

<Learn Reflective Processing Unit>

Figure 11:
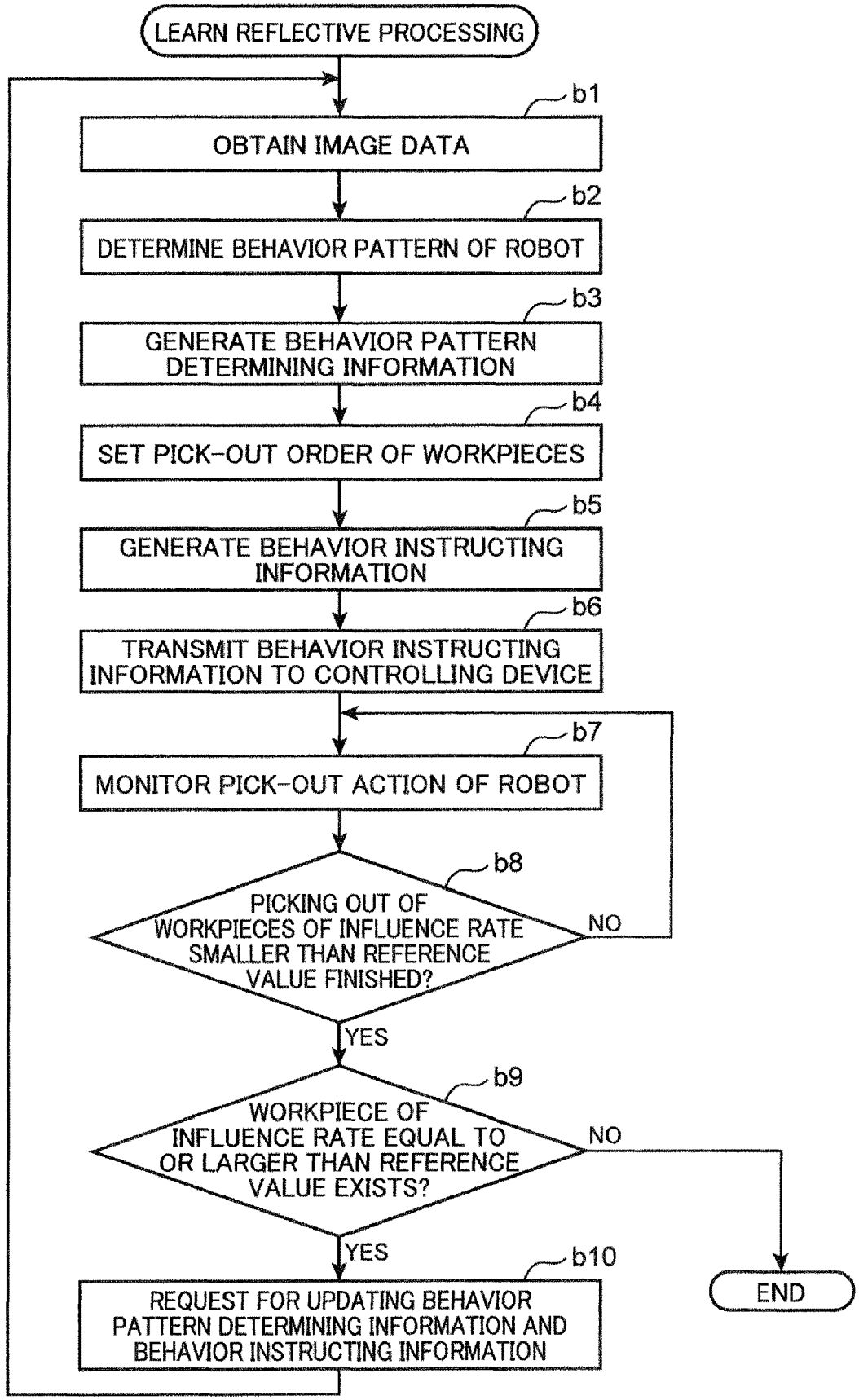
FIG. 11 is a flowchart illustrating learn reflective processing performed by the machine learning device.

The learn reflective processing unit 7 of the machine learning device 5 performs learn reflective processing of reflecting the learning result of the learn processing unit 6 in the action of the robot 2. The learn reflective processing unit 7 performs the learn reflective processing when the robot 2 performs a producing action after the learning unit 64 of the learn processing unit 6 has learned the influence rate IM. The producing action of the robot 2 is a continuous action performed by the robot 2 of picking out the workpiece W from the container CN by the hand unit 26 and placing the picked out workpiece W on a pallet PL. As illustrated in FIG. 1, the learn reflective processing unit 7 includes the behavior determining unit 71, the order setting unit 72, and an updating unit 73. Parts constituting the learn reflective processing unit 7 will be described below with reference to FIGS. 9A, 9B, 10A, 10B, and 11. FIGS. 9A and 9B are figures for explaining pieces of behavior pattern determining information JH1 and JH1A generated by the behavior determining unit 71. FIGS. 10A and 10B are figures for explaining pieces of behavior instructing information JH2 and JH2A generated by the order setting unit 72. FIG. 11 is a flowchart illustrating the learn reflective processing performed by the learn reflective processing unit 7.

(Behavior Determining Unit)

After the learning unit 64 has learned the influence rate IM, the behavior determining unit 71 transmits image capturing request information, which requests outputting image data, to the image capturing device 3 via the controlling device 4 when the robot 2 starts the producing action. The behavior determining unit 71 obtains image data captured before the pick-out action of the robot 2 and output from the image capturing device 3 in response to the image capturing request information (step b1 in FIG. 11). The behavior determining unit 71 recognizes a randomly stacked condition of a plurality of workpieces W in the container CN based on the obtained image data. The behavior determining unit 71 determines for each workpiece W a behavior pattern of the minimum influence rate IM learned by the learning unit 64 as the behavior pattern of the robot 2 to pick out the workpiece W from the container CN by the hand unit 26 (step b2 in FIG. 11).

The behavior determining unit 71 generates the behavior pattern determining information JH1 illustrated in FIG. 9A as information indicating a result of determining the behavior pattern for each workpiece W (step b3 in FIG. 11). In the behavior pattern determining information JH1, workpiece type information J11 for specifying each workpiece W in the container CN, behavior pattern information J12 indicating the behavior pattern for each workpiece W, and influence rate information J13 indicating the influence rate IM on the untargeted workpiece W for picking out the targeted workpiece W are associated among each other.

The behavior pattern determining information JH1 illustrated in FIG. 9A is described in detail below. The behavior determining unit 71 recognizes the randomly stacked condition of the workpieces "W1", "W2", "W3", "W4", and "W5" in the container CN based on the image data which is output from the image capturing device 3. The behavior determining unit 71 determines a behavior pattern "behavior A1" associated with a minimum influence rate IM of "20" learned by the learning unit 64 as the behavior pattern of the robot 2 to pick out the workpiece "W1" from the container CN. The behavior determining unit 71 determines a behavior pattern "behavior A2" associated with a minimum influence rate IM of "10" learned by the learning unit 64 as the behavior pattern of the robot 2 to pick out the workpiece "W2" from the container CN. The behavior determining unit 71 determines a behavior pattern "behavior A3" associated with a minimum influence rate IM of "1" learned by the learning unit 64 as the behavior pattern of the robot 2 to pick out the workpiece "W3" from the container CN. The behavior determining unit 71 determines a behavior pattern "behavior A4" associated with the minimum influence rate IM of "0.5" learned by the learning unit 64 as the behavior pattern of the robot 2 to pick out the workpiece "W4" from the container CN. The behavior determining unit 71 determines a behavior pattern "behavior A5" associated with the minimum influence rate IM of "0.1" learned by the learning unit 64 as the behavior pattern of the robot 2 to pick out the workpiece "W5" from the container CN. The behavior pattern determining information JH1 is the information indicating the result of determining the behavior pattern for each workpiece W by the behavior determining unit 71, as described above, in a form including the workpiece type information J11, the behavior pattern information J12, and the influence rate information J13 associated among each other.

The behavior pattern determining information JH1 generated by the behavior determining unit 71 is output to the controlling device 4. The controlling device 4 to which the behavior pattern determining information JH1 is input can control the pick-out action of the robot 2 based on the behavior pattern determining information JH1.

The behavior determining unit 71 determines for each workpiece W a behavior pattern of a minimum influence rate IM as a behavior pattern of the robot 2 to pick out the workpiece W from the container CN to reflect the learning result of the learning unit 64 in the pick-out action in an actual production by the robot 2. In the actual production, the robot 2 follows for each workpiece W the behavior pattern determined by the behavior determining unit 71, and thereby performs an optimum pick-out action of a small influence rate IM on the untargeted workpiece W, thereby preventing damages to the workpiece W.

The behavior determining unit 71 determines the behavior pattern of the robot 2 for each workpiece W in the container CN based on the image data captured by a single shot and output from the image capturing device 3. That is, in the actual production, the image capturing device 3 not always captures an image every time when the workpiece W is picked out to determine the behavior pattern of the robot 2 to pick out the workpiece W. The behavior pattern of the robot 2 for each workpiece W in the container CN is determined based on the image data captured by a single shot, and the robot 2 can sequentially pick out a plurality of workpieces W following the determined behavior patterns. In this manner, the number of shots to capture images by the image capturing device 3 can be reduced in the actual production, and an idling time of the robot 2 due to capturing images can be shortened, thereby improving a production efficiency. When the robot 2 is a dual-arm robot or a robot having a plurality of hand units 26, a plurality of workpieces W can continuously be picked out by following the behavior pattern determined by the behavior determining unit 71. Thus, for a dual-arm robot or a robot having a plurality of hand units 26, the production efficiency can further be improved.

On receiving update request information that requests updating of the behavior pattern determining information JH1 which is output from the updating unit 73 described later, the behavior determining unit 71 updates the operation of determining the behavior pattern of the robot 2, generates updated behavior pattern determining information JH1A illustrated in FIG. 9B, and outputs the updated behavior pattern determining information JH1A to the controlling device 4. The controlling device 4 to which the updated behavior pattern determining information JH1A is input can control the pick-out action of the robot 2 based on the behavior pattern determining information JH1A. Detail on the updated behavior pattern determining information JH1A will be described later.

(Order Setting Unit)

The order setting unit 72 refers to the behavior pattern determining information JH1 and sets a pick-out order of picking out the workpieces W from the container CN based on the behavior patterns of the robot 2 determined by the behavior determining unit 71 so as the behavior pattern of a smaller influence rate IM to be ranked higher (step b4 in FIG. 11).

The order setting unit 72 generates behavior instructing information JH2 illustrated in FIG. 10A as information indicating a result of setting the pick-out order (step b5 in FIG. 11). The behavior instructing information JH2 includes influence reference value information J21 indicating a reference value IMS of the influence rate IM, and behavior list information J22. The reference value IMS indicated by the influence reference value information J21 is referred when the updating unit 73, described later, monitors the pick-out action of the robot 2. In the behavior list information J22, data in which the workpiece type information J11, the behavior pattern information J12, and the influence rate information J13 are associated among each other is formed into a list arranged in the pick-out order, set by the order setting unit 72, to pick out the workpieces W. That is, in the behavior list information J22, the data in which the workpiece type information J11, the behavior pattern information J12, and the influence rate information J13 are associated among each other is formed into a list of elements arranged in the ascending order of the influence rate IM indicated by the influence rate information J13.

The behavior instructing information JH2 generated by the order setting unit 72 is output to the controlling device 4 (step b6 in FIG. 11). The controlling device 4 to which the behavior instructing information JH2 is input can control the pick-out action of the robot 2 following the pick-out order of picking out the workpieces W based on the behavior list information J22 included in the behavior instructing information JH2. The behavior list information J22 included in the behavior instructing information JH2 is the same as the behavior pattern determining information JH1 generated by the behavior determining unit 71 except that the order in the data in which the workpiece type information J11, the behavior pattern information J12, and the influence rate information J13 are associated among each other is different. Thus, when the behavior instructing information JH2 is output to the controlling device 4, the behavior pattern determining information JH1 is not output to the controlling device 4.

As described above, the order setting unit 72 sets the pick-out order of picking out the workpieces W from the container CN. In the actual production, the robot 2 just picks out the workpieces W from the container CN, following the pick-out order which is set by the order setting unit 72. The robot 2 can thereby perform the pick-out action in such a manner that the workpiece W of a smaller influence rate IM on the untargeted workpiece W is picked out first.

On receiving the update request information, which requests updating of the behavior instructing information JH2 and is output from the updating unit 73 described later, the order setting unit 72 updates the operation of setting the pick-out order of picking out the workpieces W, generates the updated behavior instructing information JH2A illustrated in FIG. 10B, and outputs the updated behavior instructing information JH2A to the controlling device 4. The controlling device 4 to which the updated behavior instructing information JH2A is input can control the pick-out action of the robot 2 following the pick-out order of picking out the workpieces W based on the behavior list information J22 included in the behavior instructing information JH2A. Detail on the updated behavior instructing information JH2A will be described later.

(Updating Unit)

The updating unit 73 monitors the pick-out action of the robot 2 following the pick-out order of picking out the workpieces W, which order set by the order setting unit 72, when the robot 2 performs the producing action controlled by the controlling device 4 based on the behavior list information J22 included in the behavior instructing information JH2 (step b7 in FIG. 11). The updating unit 73 determines whether all the workpieces W each ranked by the influence rate IM, indicated by the influence rate information J13, smaller than the predetermined reference value IMS indicated by the influence reference value information J21 have been picked out from container CN (step b8 in FIG. 11). If it is determined that all the workpieces W each ranked by the influence rate IM smaller than the predetermined reference value IMS have been picked out, the updating unit 73 determines whether any workpiece W ranked by the influence rate IM equal to or larger than the reference value IMS exists (step b9 in FIG. 11).

The updating unit 73 updates the operation of the behavior determining unit 71 of determining the behavior pattern and the operation of the order setting unit 72 of setting the pick-out order of picking out the workpiece W, when all the workpieces W each ranked by the influence rate IM smaller than the reference value IMS have been picked out and the workpiece W ranked by the influence rate IM equal to or larger than the reference value IMS exists. The updating unit 73 outputs the update request information that requests updating of the behavior pattern determining information JH1 to the behavior determining unit 71 and the update request information that requests updating of the behavior instructing information JH2 to the order setting unit 72 to update operations of the behavior determining unit 71 and the order setting unit 72 (step b10 in FIG. 11).

An operation of the updating unit 73 will be described with reference to the behavior instructing information JH2 illustrated in FIG. 10A. The robot 2 controlled by the controlling device 4 performs the pick-out action based on the behavior pattern indicated by the behavior pattern information J12, following the pick-out order registered in the behavior list information J22, the pick-out order being such that the workpiece W of a smaller influence rate IM indicated by the influence rate information J13 is picked out first. The updating unit 73 monitors the pick-out action of the robot 2. In the example illustrated in FIG. 10A, the workpieces W5, W4, and W3, which are ranked "1 to 3" in the pick-out order, are workpieces W each ranked by the influence rate IM smaller than the reference value IMS (for example, "2"). Meanwhile, the workpieces W each ranked "4" or lower in the pick-out order, such as the workpiece W2, are workpieces W each ranked by the influence rate IM equal to or larger than the reference value IMS. In such a case, the updating unit 73 outputs the update request information to the behavior determining unit 71 and the order setting unit 72 to update the operations of both the units when all the workpieces W5, W4, and W3 ranked "1 to 3" in the pick-out order have been picked out.

The pick-out action for the workpiece W based on the behavior pattern of the influence rate IM smaller than the reference value IMS can prevent damages to the workpiece W since the influence rate IM on the untargeted workpiece W is relatively small. Meanwhile, the pick-out action for the workpiece W based on the behavior pattern of the influence rate IM equal to or larger than the reference value IMS may cause damages to the workpiece W since the influence rate IM on the untargeted workpiece W is relatively large.

In the actual production, the robot 2 just picks out all the workpieces W each ranked by the influence rate IM smaller than the reference value IMS from the container CN, following the pick-out order set by the order setting unit 72. In this manner, the robot 2 can continuously pick out every workpiece W of a relatively small influence rate IM on the untargeted workpiece W and in a range to prevent damages to the workpiece W.

When the pick-out action of the robot 2 to pick out all the workpieces W each ranked by the influence rate IM smaller than the reference value IMS has been finished, the randomly stacked condition of the remaining workpieces W in the container CN has been changed from the state before the pick-out action. At this timing, the updating unit 73 updates the operation of the behavior determining unit 71 of determining the behavior pattern and the operation of the order setting unit 72 of determining the pick-out order. That is, when the pick-out action of the robot 2 to pick out all the workpieces W each ranked by the influence rate IM smaller than the reference value IMS is finished, the updated operation of the behavior determining unit 71 of determining the behavior pattern based on new image data which is output from the image capturing device 3 and the updated operation of the order setting unit 72 of setting the pick-out order are performed before the pick-out action is performed on the workpiece W.

(Updating Operation of Behavior Determining Unit)

On receiving the update request information which is output from the updating unit 73, the behavior determining unit 71 repeats step b1 to step b3 illustrated in FIG. 11 to update the operation of determining the behavior pattern of the robot 2, and generates the updated behavior pattern determining information JH1A illustrated in FIG. 9B.

The behavior pattern determining information JH1A illustrated in FIG. 9B is described in detail below. Based on the new image data which is output from the image capturing device 3 after receiving the update request information from the updating unit 73, the behavior determining unit 71 recognizes the randomly stacked condition of the workpieces including "W1", "W2", "W6", "W7", and "W8" remaining in the container CN after all the workpieces W5, W4, and W3 each ranked by the influence rate IM smaller than the reference value IMS have been picked out. As described above, when the pick-out action of the robot 2 to pick out all the workpieces W each ranked by the influence rate IM smaller than the reference value IMS has been finished, the randomly stacked condition of the remaining workpieces W in the container CN has been changed from the state before the pick-out action. Thus, there is also a change in the influence rate IM on the workpieces W remaining in the container CN.

The behavior determining unit 71 determines a behavior pattern "behavior A11" associated with a minimum influence rate IM of "0.2" learned by the learning unit 64 as a behavior pattern of the robot 2 to pick out the workpiece "W1" from the container CN. The behavior determining unit 71 determines a behavior pattern "behavior A21" associated with a minimum influence rate IM of "0.01" learned by the learning unit 64 as a behavior pattern of the robot 2 to pick out the workpiece "W2" from the container CN. The behavior determining unit 71 determines a behavior pattern "behavior A61" associated with a minimum influence rate IM of "0.3" learned by the learning unit 64 as a behavior pattern of the robot 2 to pick out the workpiece "W6" from the container CN. The behavior determining unit 71 determines a behavior pattern "behavior ΔZ1" associated with a minimum influence rate IM of "20" learned by the learning unit 64 as a behavior pattern of the robot 2 to pick out the workpiece "W7" from the container CN. The behavior determining unit 71 determines a behavior pattern "behavior A81" associated with a minimum influence rate IM of "40" learned by the learning unit 64 as a behavior pattern of the robot 2 to pick out the workpiece "W8" from the container CN. The updated behavior pattern determining information JH1A indicates the updated result of determining the behavior pattern for each workpiece W by the behavior determining unit 71, as described above, as information in which the workpiece type information J11, the behavior pattern information J12, and the influence rate information J13 associated among each other.

After the pick-out action by the robot 2 to pick out all the workpieces W each ranked by the influence rate IM smaller than the reference value IMS, the behavior determining unit 71 updates and determines for each workpiece W a behavior pattern of a minimum influence rate IM as a behavior pattern of the robot 2 to pick out the workpieces W remaining in the container CN. In the actual production, the robot 2 follows for each workpiece W the behavior pattern updated and determined by the behavior determining unit 71, and performs an optimum pick-out action of a small influence rate IM on the untargeted workpiece W, thereby preventing damages to the workpiece W.

(Updating Operation of Order Setting Unit)

On receiving the update request information which is output from the updating unit 73, the order setting unit 72 repeats step b4 to step b6 illustrated in FIG. 11 described above to update the operation of setting the pick-out order for the workpieces W, and generates the updated behavior instructing information JH2A illustrated in FIG. 10B.

The behavior list information J22 included in the behavior instructing information JH2A updated by the order setting unit 72 is the same as the behavior pattern determining information JH1A updated by the behavior determining unit 71 except that the order in the data in which the workpiece type information J11, the behavior pattern information J12, and the influence rate information J13 are associated among each other is different. In the behavior list information J22, data in which the workpiece type information J11, the behavior pattern information J12, and the influence rate information J13 are associated among each other is formed into a list of elements arranged in the ascending order of the influence rate IM indicated by the influence rate information J13.

The behavior instructing information JH2A updated by the order setting unit 72 is output to the controlling device 4. The controlling device 4 to which the behavior instructing information JH2A is input can control the pick-out action of the robot 2 following the updated pick-out order of picking out the workpieces W based on the behavior list information J22 included in the behavior instructing information JH2A.

As described above, the order setting unit 72 updates and sets the pick-out order of picking out the workpieces W remaining in the container CN. In the actual production, the robot 2 just picks out the workpieces W remaining in the container CN, following the pick-out order updated by the order setting unit 72. The robot 2 can thereby perform the pick-out action in such a manner that the workpiece W of a smaller influence rate IM on the untargeted workpiece W is picked out first.

The specific embodiments described above mainly include the following embodiments.

A machine learning device according to one aspect of the present disclosure learns an action of a robot including a hand unit to pick out, from a container containing a plurality of randomly stacked workpieces, the workpiece. The machine learning device includes a behavior observing unit configured to observe a behavior pattern of the robot performing a pick-out action to pick out a targeted workpiece by the hand unit from the container, a displaced amount observing unit configured to observe, based on pieces of image data captured before and after the pick-out action by the robot and output from an image capturing device that captures an image of an inside of the container, a workpiece displaced amount indicating a displaced amount of an untargeted workpiece, not the targeted workpiece, in the container, caused by the hand unit picking out the targeted workpiece from the container, and a learning unit configured to learn, based on supervised data in which the behavior pattern and the workpiece displaced amount are associated with each other, an influence rate on the untargeted workpiece with the associated behavior pattern for picking out the targeted workpiece by the hand unit from the container, the influence rate depending on the workpiece displaced amount.

According to the machine learning device, the behavior pattern of the robot to pick out the targeted workpiece from the container is observed by the behavior observing unit, and the workpiece displaced amount of the untargeted workpiece in the container caused by the pick-out action of the robot is observed by the displaced amount observing unit. The learning unit learns, based on the supervised data in which the behavior pattern of the robot is associated with the workpiece displaced amount, the influence rate on the untargeted workpiece with the associated behavior pattern for picking out the targeted workpiece from the container, the influence rate depending on the workpiece displaced amount.

The workpiece displaced amount is an index of an effect of an impact force on the untargeted workpiece and a collapse rate of the untargeted workpieces caused or resulting from picking out the targeted workpiece from the container. That is, the impact force against the untargeted workpiece and the collapse rate of the untargeted workpieces are smaller for a smaller workpiece displaced amount, and the corresponding influence rate on the untargeted workpiece is smaller. Since the learning unit learns the influence rate on the untargeted workpiece with the associated behavior pattern, the influence rate depending on the workpiece displaced amount, the learning unit can learn a behavior pattern of the robot of a small influence rate on the untargeted workpiece for picking out the targeted workpiece from the container. Thus, an optimum pick-out action of the robot of a small influence rate on the untargeted workpieces can be learned to prevent damages to the workpieces.

The machine learning device may further include a behavior determining unit configured to recognize, when the pieces of image data captured before the pick-out action of the robot is output from the image capturing device after the learning unit has learned the influence rate, a randomly stacked condition of the plurality of workpieces in the container based on the image data, and determines for each of the workpieces a behavior pattern of a minimum influence rate as a behavior pattern of the robot to pick out each of the workpieces by the hand unit from the container.

In this configuration, the behavior determining unit determines for each workpiece the behavior pattern of a minimum influence rate as the behavior pattern of the robot to pick out the workpiece from the container to reflect the result of the learning by the learning unit in an actual pick-out action by the robot. In the actual production, the robot follows for each workpiece the behavior pattern determined by the behavior determining unit, and performs an optimum pick-out action of a small influence rate on an untargeted workpiece to prevent damages to the workpiece.

The behavior determining unit determines the behavior pattern of the robot for each workpiece in the container based on the image data captured by a single shot and output from the image capturing device. That is, in the actual production, the image capturing device not always captures an image every time when the workpiece is picked out to determine the behavior pattern of the robot to pick out the workpiece. The behavior pattern of the robot for each workpiece in the container is determined based on the image data captured by a single shot, and the robot can sequentially pick out a plurality of workpieces following the determined behavior patterns. In this manner, the number of shots to capture images by the image capturing device can be reduced in the actual production, and an idling time of the robot due to capturing images can be shortened, thereby improving a production efficiency.

The machine learning device may further include an order setting unit configured to set a pick-out order of picking out the workpieces from the container based on the behavior pattern, determined by the behavior determining unit, of the robot so as the behavior pattern of a smaller influence rate to be ranked higher.

In this configuration, the order setting unit sets the pick-out order of picking out the workpieces from the container. In the actual production, the robot just picks out the workpieces from the container, following the pick-out order set by the order setting unit. The robot can thereby perform the pick-out action in such a manner that the workpiece of a smaller influence rate on the untargeted workpiece is picked out first.

The machine learning device may further include an updating unit configured to monitor the pick-out action of the robot following the pick-out order that is set by the order setting unit, and updates, when all workpieces each ranked by the influence rate smaller than a predetermined reference value have been picked out from the container, an operation of the behavior determining unit of determining a behavior pattern and an operation of the order setting unit of setting the pick-out order.

The pick-out action for the workpiece based on the behavior pattern of the influence rate smaller than the reference value can prevent damages to the workpiece since the influence rate on the untargeted workpiece is relatively small. Meanwhile, the pick-out action for the workpiece based on the behavior pattern of the influence rate equal to or larger than the reference value may cause damages to the workpiece since the influence rate on the untargeted workpiece is relatively large.

In the actual production, the robot just picks out all the workpieces each ranked by the influence rate smaller than the reference value from the container, following the pick-out order set by the order setting unit. In this manner, the robot can continuously pick out every workpiece which is of a relatively small influence rate on the untargeted work and in a range preventing damages to the workpiece. When the pick-out action by the robot is finished, the randomly stacked condition of the workpieces in the container has changed from the condition before the pick-out action. At this timing, the updating unit updates the operation of the behavior determining unit of determining the behavior pattern and the operation of the order setting unit of setting the pick-out order. That is, when the pick-out action of the robot to pick out all the workpieces each ranked by the influence rate smaller than the reference value is finished, the updated operation of the behavior determining unit of determining the behavior pattern based on new image data which is output from the image capturing device and the updated operation of the order setting unit of setting the pick-out order are performed before the pick-out action is performed on the workpiece. Just following the behavior pattern updated and determined by the behavior determining unit and also following the pick-out order updated and set by the order setting unit, the robot picks out the workpieces from the container.

In the machine learning device, the hand unit grabs a workpiece in the container and picks out the workpiece from the container, and a behavior element that defines a behavior pattern of the robot observed by the behavior observing unit includes a grab position at which the hand unit grabs the targeted workpiece to pick out the targeted workpiece.

The behavior pattern of the robot observed by the behavior observing unit constitutes the supervised data used by the learning unit when learning the action of the robot. Since the grab position at which the hand unit grabs the workpiece is included as an element of the behavior element defining the behavior pattern of the robot constituting the supervised data, the learning unit can learn such a behavior pattern of the robot that takes the grab position into consideration to reduce the influence rate on the untargeted workpieces.

A robot system according to another aspect of the present disclosure includes a robot including a hand unit that picks out, from a container containing a plurality of randomly stacked workpieces, the workpiece, an image capturing device that captures an image of an inside of the container and outputs image data, the machine learning device configured to learn, based on the image data, a pick-out action of the robot to pick out the workpiece from the container by the hand unit, and a controlling device configured to control an action of the robot based on a learning result of the machine learning device.

The robot system includes the machine learning device that can learn an optimum action of the robot to pick out the workpiece from the container. Thus, to pick out the targeted workpiece from the container in the actual production, the robot can perform the optimum pick-out action of a small influence rate on an untargeted workpiece to prevent damages to the workpiece.

According to the present disclosure as described above, a machine learning device that can learn an optimum action of a robot to pick out a workpiece from a container containing a plurality of randomly stacked workpieces and a robot system including the machine learning device are provided.

What is claimed is:

1. A machine learning device that learns an action of a robot including a hand unit to pick out a targeted workpiece from a container containing a plurality of randomly stacked workpieces, the machine learning device comprising:
   a behavior observing unit configured to observe a behavior pattern of the robot performing a pick-out action to pick out the targeted workpiece by the hand unit from the container;
   a displaced amount observing unit configured to observe, based on pieces of image data captured before and after the pick-out action by the robot and output from an image capturing device that captures an image of an inside of the container, a workpiece displaced amount indicating a displaced amount of an untargeted workpiece, not the targeted workpiece, in the container, caused by the hand unit picking out the targeted workpiece from the container;
   a learning unit configured to learn, based on supervised data in which the behavior pattern and the workpiece displaced amount are associated with each other, an influence value on the untargeted workpiece with the behavior pattern for picking out the targeted workpiece by the hand unit from the container, an influence rate depending on the workpiece displaced amount,
   a behavior determining unit configured to recognize, when the pieces of image data captured by a single shot conducted before the pick-out action of the robot is output from the image capturing device after the learning unit has learned the influence value, a randomly stacked condition of the plurality of workpieces in the container based on the image data, and determine for each of the workpieces a behavior pattern of a minimum influence value as a behavior pattern of the robot to pick out each of the workpieces by the hand unit from the container; and
   a determined unit configured to determine whether all the workpieces each ranked by the influence rate smaller than a predetermined reference value and recognized based on the image data captured by the single shot have been picked out from the container.

2. The machine learning device according to claim 1, further comprising:
   an order setting unit configured to set a pick-out order of picking out each of the workpieces from the container based on the behavior pattern, determined by the behavior determining unit, of the robot so as the behavior pattern of a smaller influence value to be ranked higher.

3. The machine learning device according to claim 2, further comprising:
   an updating unit configured to monitor the pick-out action of the robot following the pick-out order that is set by the order setting unit, and update, when all workpieces each ranked by the influence value smaller than a predetermined reference value have been picked out from the container, an operation of the behavior determining unit of determining the behavior pattern and an operation of the order setting unit of setting the pick-out order.

4. The machine learning device according to claim 3, wherein
   the hand unit is configured to grab a workpiece in the container and picks out the workpiece from the container, and
   a behavior element that defines the behavior pattern of the robot observed by the behavior observing unit includes a grab position at which the hand unit grabs the targeted workpiece to pick out the targeted workpiece.

5. A robot system comprising:
   the machine learning device according to claim 4;
   the robot;
   the image capturing device; and
   a controller,
   the machine learning device being configured to learn, based on the image data output by the robot, a pick-out action of the robot to pick out the workpiece from the container by the hand unit; and
   the controller being configured to control an action of the robot based on a learning result of the machine learning device.

6. A robot system comprising:
   the machine learning device according to claim 3;
   the robot;
   the image capturing device; and
   a controller,
   the machine learning device being configured to learn, based on the image data output by the robot, a pick-out action of the robot to pick out the workpiece from the container by the hand unit; and
   the controller being configured to control an action of the robot based on a learning result of the machine learning device.

7. The machine learning device according to claim 2, wherein
   the hand unit is configured to grab a workpiece in the container and picks out the workpiece from the container, and
   a behavior element that defines the behavior pattern of the robot observed by the behavior observing unit includes a grab position at which the hand unit grabs the targeted workpiece to pick out the targeted workpiece.

8. A robot system comprising:
   the machine learning device according to claim 7;
   the robot;
   the image capturing device; and
   a controller,
   the machine learning device being configured to learn, based on the image data output by the robot, a pick-out action of the robot to pick out the workpiece from the container by the hand unit; and
   the controller being configured to control an action of the robot based on a learning result of the machine learning device.

9. A robot system comprising:
   the machine learning device according to claim 2;
   the robot;
   the image capturing device; and
   a controller,
   the machine learning device being configured to learn, based on the image data output by the robot, a pick-out action of the robot to pick out the workpiece from the container by the hand unit; and
   the controller being configured to control an action of the robot based on a learning result of the machine learning device.

10. A robot system comprising:
    the machine learning device according to claim 1;
    the robot;
    the image capturing device; and
    a controller,
    the machine learning device being configured to learn, based on the image data output by the robot, a pick-out action of the robot to pick out the workpiece from the container by the hand unit; and the controller being configured to control an action of the robot based on a learning result of the machine learning device.

* * * * *